United States Patent
Davis et al.

(10) Patent No.: US 9,949,446 B2
(45) Date of Patent: Apr. 24, 2018

(54) CANOPY TREATMENT SYSTEM

(71) Applicant: Skavis Corporation, Woodstock, GA (US)

(72) Inventors: Randall James Davis, Woodstock, GA (US); Charles Francis Noll, Jr., Woodstock, GA (US); Tom Wallis Airhart, Lubbock, TX (US); James Seth Niece, Woodstock, GA (US); Brian Lee Kelley, Dundee, FL (US); Matthew Phillip Vogel, Acworth, GA (US)

(73) Assignee: Skavis Corporation, Woodstock, GA (US)

( * ) Notice: Subject to any disclaimer, the term of this patent is extended or adjusted under 35 U.S.C. 154(b) by 153 days.

(21) Appl. No.: 14/872,899

(22) Filed: Oct. 1, 2015

(65) Prior Publication Data

US 2016/0165805 A1 Jun. 16, 2016

Related U.S. Application Data

(60) Provisional application No. 62/152,558, filed on Apr. 24, 2015.

(51) Int. Cl.
*A01G 7/06* (2006.01)
*A01G 13/06* (2006.01)
(Continued)

(52) U.S. Cl.
CPC ............... *A01G 7/06* (2013.01); *A01G 1/001* (2013.01); *A01G 13/0206* (2013.01);
(Continued)

(58) Field of Classification Search
CPC ........ A01G 13/06; A01G 13/065; A01G 7/06; A01G 1/001; A01G 13/02; A01G 13/08; A01G 13/0206; A01G 13/0231
(Continued)

(56) References Cited

U.S. PATENT DOCUMENTS

| | | | |
|---|---|---|---|
| 947,519 A | 1/1910 | McAdie | |
| 1,126,426 A | 1/1915 | Eddy | |
| 1,820,040 A * | 8/1931 | Zuckerman | .......... A01G 13/043 383/116 |
| 1,834,084 A | 12/1931 | Barnes | |
| 3,205,885 A | 9/1965 | Baxley | |

(Continued)

FOREIGN PATENT DOCUMENTS

WO 9921418 5/1999

OTHER PUBLICATIONS

Davis, Randall; U.S. Patent Application entitled: Mobile Tree Canopy Treatment System having U.S. Appl. No. 14/843,413, filed Sep. 2, 2015, 51 pgs.

(Continued)

*Primary Examiner* — Joshua D Huson

(74) *Attorney, Agent, or Firm* — Taylor English Duma LLP

(57) ABSTRACT

A canopy treatment system to treat plants is disclosed. In one implementation according to examples of the present disclosure, a method comprises moving a canopy treatment system proximate to a plant to be treated, the canopy treatment system including a hot fluid generating system and a canopy, the canopy defining a treatment region and in fluid communication with the hot fluid generating system. The method further comprises lowering the canopy relative to the hot fluid generating system to position the canopy around the plant with the plant within the treatment region of the canopy; and heating the plant within the canopy.

18 Claims, 28 Drawing Sheets

(51) Int. Cl.
| | |
|---|---|
| *A01G 13/02* | (2006.01) |
| *A01G 13/08* | (2006.01) |
| *G05B 15/02* | (2006.01) |
| *G05D 7/06* | (2006.01) |
| *G05D 23/19* | (2006.01) |
| *A01G 1/00* | (2006.01) |

(52) U.S. Cl.
CPC ............ *A01G 13/06* (2013.01); *A01G 13/08* (2013.01); *G05B 15/02* (2013.01); *G05D 7/0629* (2013.01); *G05D 7/0676* (2013.01); *G05D 23/19* (2013.01); *G05D 23/1917* (2013.01)

(58) Field of Classification Search
USPC ................................ 47/23.1–23.3, 32.2–32.3
See application file for complete search history.

(56) References Cited

U.S. PATENT DOCUMENTS

| | | | |
|---|---|---|---|
| 3,296,739 A | 1/1967 | Wiegel | |
| 3,395,485 A | 8/1968 | Rooklidge | |
| 3,788,542 A * | 1/1974 | Mee ..................... | A01G 13/065 239/11 |
| 3,830,014 A | 8/1974 | Baker | |
| 4,015,366 A | 4/1977 | Hall, III | |
| 4,787,173 A | 11/1988 | Lewis | |
| 5,099,602 A | 3/1992 | Arnold et al. | |
| 5,228,621 A | 7/1993 | Wilson et al. | |
| 5,575,109 A | 11/1996 | Kuntz | |
| 5,662,267 A | 9/1997 | Hulls | |
| 5,848,492 A | 12/1998 | Brown | |
| 5,897,057 A | 4/1999 | Hulls | |
| 6,047,900 A | 4/2000 | Newson et al. | |
| 6,257,498 B1 * | 7/2001 | Siebol .................... | A01G 13/06 239/129 |
| 6,698,135 B1 | 3/2004 | Robbins | |
| 7,533,487 B1 | 5/2009 | Mantkowski et al. | |
| 7,637,053 B1 | 12/2009 | McAnulty | |
| 7,645,091 B2 | 1/2010 | Wallace | |
| 7,650,716 B1 | 1/2010 | Schemeley | |
| 7,849,631 B2 * | 12/2010 | Marc ...................... | A01G 13/06 47/2 |
| D659,587 S | 5/2012 | Willsie | |
| 8,225,545 B1 | 7/2012 | Collins | |
| 8,683,741 B2 | 4/2014 | Castagno et al. | |
| 2002/0050095 A1 | 5/2002 | McMullin | |
| 2005/0217484 A1 | 10/2005 | Bourgault et al. | |
| 2010/0286833 A1 | 11/2010 | Kaprielian | |
| 2011/0247264 A1 * | 10/2011 | Luciano, Jr. ......... | A01G 13/065 47/2 |
| 2013/0160357 A1 * | 6/2013 | Luciano, Jr. ......... | A01G 13/065 47/2 |
| 2013/0308675 A1 | 11/2013 | Sneed et al. | |
| 2015/0053151 A1 | 2/2015 | Graff | |
| 2015/0087893 A1 | 3/2015 | Hill et al. | |
| 2015/0305254 A1 * | 10/2015 | Ehsani ................ | A01G 13/0212 47/57.7 |
| 2016/0057941 A1 * | 3/2016 | Davis ..................... | G05B 15/02 47/1.5 |
| 2016/0062369 A1 * | 3/2016 | Davis ..................... | G05B 15/02 700/282 |
| 2016/0174475 A1 * | 6/2016 | Mirzakhani Nafchi | A01G 7/06 47/1.3 |

OTHER PUBLICATIONS

Davis, Randall James; U.S. Patent Application entitled: Control System for a Canopy having U.S. Appl. No. 14/872,976, filed Oct. 1, 2015, 79 pgs.
Ehansi, Reza J.; U.S. Patent Application entitled: Methods and Devices for Reduction of Plant Infections, having U.S. Appl. No. 14/699,156, filed Apr. 29, 2015, 55 pgs.
Ehsani, Reza J.; U.S. Provisional Application entitled: Methods and Devices for Reduction of Plant Infections, having U.S. Appl. No. 61/985,638, filed Apr. 29, 2014, 30 pgs.
Davis, Randall James; PCT Application entitled: Canopy Treatment System and Control System having serial No. PCT/US15/53615, filed Oct. 1, 2015, 89 pgs.
Deng, X, et al.; Heat treatment of Huanglongbing-affected citrus trees in field for reduction of "Candidatus Liberibacter asiaticus"; Published Nov. 8, 2012; USDA; 1 page.
Duan, Ping, et al.; Development and Implementation of New Control Strategies for Citrus Huanglongbing (Greening); 2012 Annual Report; USDA; 2 pages.
Hoffman et al.; Heat treatment eliminates 'Candidatus Liberibacter asiaticus' from infected citrus trees under controlled conditions; Published Jan. 1, 2013; USDA; 2 pages.
Kanitz, William; Article entitled: "Mobile Steam Delivery Platform Engineered by ScoringAg, Inc.", [online web page, bearing publication date of Oct. 15, 2014, 2 pgs. Retrieved on Dec. 4, 2015 from the Internet: <http://www.przoom.com/news/147492/>.
Kanitz, William; Article entitled: "TreeSteamer-Batch by ScoringAg for citrus greening and other citrus diseases", [online web page], earliest available data from the Internet Archive (Wayback machine) for higher-level, parent web page (data for the web page itself unavailable) bears a date of Nov. 7, 2014, 1 pg. Retrieved on Dec. 4, 2015 from the Internet: <http://scoringag-equipment.com/hardCopy/TreeSteamer-BatchC.pdf>.
Fresh Plaza; Article entitled: "Steam heat natural solution to greening disease", [online web page], bearing a publication date of Nov. 21, 2014, 2 pgs. Retrieved on Dec. 4, 2015 from the Internet: <http://www.freshplaza.com/article/131444/Steam-heat-natural-solution-to-greening-disease>.
ScoringAg, Inc.; Article entitled: "Operating pictures TreeSteamer-Mini", [online web page], earliest available data from the Internet Archive (Wayback Machine) for the web page bears a date of Oct. 2, 2015, 2 pgs. Retrieved on Dec. 4, 2015 from the Internet: <http://scoringag-equipment.com/product-template8.html>.
ScoringAg, Inc.; Article entitled "TreeSteamer-Mini Model by ScoringAg", [online web page], bearing a copyright date of Apr. 9, 2015, 1 pg. Retrieved on Dec. 4, 2015 from the Internet: <http://scoringag-equipment.com/hardCopy/TreeSteamerCMini.pdf>.
ScoringAg, Inc.; Article entitled: "Operating pictures TreeSteamer Trailer Model 14' or 21'", [online web page], earliest available data from the Internet Archive (Wayback Machine) for the web page bears a date of Oct. 2, 2015, 2 pgs. Retrieved on Dec. 4, 2015 from the Internet: <http://scoringag-equipment.com/product-template7.html>.
ScoringAg, Inc.; Article entitled "The TreeSteamer Trailer Model by ScoringAg", [online web page], bearing a copyright date of Mar. 17, 2015, 1 pg. Retrieved on Dec. 4, 2015 from the Internet: <http://scoringag-equipment.com/hardCopy/tflyerTrailerModel.pdf>.
Davis, Randall James; International Search Report and Written Opinion for serial No. PCT/US15/53615, filed Oct. 1, 2015, dated Jan. 29, 2016, 14 pgs.
Ehsani, Reza J.; Non-final Office Action for U.S. Appl. No. 14/699,156, filed Apr. 29, 2015, dated May 16, 2017, 36 pgs.
ScoringAg, Inc.; Article entitled: "Operating pictures The TreeSteamer Tunnel model", located at <http://scoringag-equipment.com/product-template6.html>, publicly available prior to Oct. 1, 2015, 2 pgs.
ScoringAg, Inc.; Article entitled: "The TreeSteamer invented by ScoringAg, Inc. beats HLB Citrus Greening", published May 24, 2014, 2 pgs.
USDA; Article entitled "Prescription for Curing Citrus Greening: Apply Heat and Wait", located at http://www.ars.esda.gov/is/AR/archive/aug13/citrus0813.htm>, accessed on Feb. 25, 2015, 2 pgs.
Southeast AgNET; Article entitled: "Citrus Tree Steamer Attends Citrus Expo," located at <http://southeastagnet.com/2015/08/26/citrustreesteamerattendscitrusexpo/>, publicly available prior to Oct. 1, 2015, 8 pgs.

(56) References Cited

OTHER PUBLICATIONS

Southeast AgNET; Article entitled: "Thermotherapy Field Day", located at <http://southeastagnet.com/2015/07/13/thermotherapyfieldday/>, publicly available prior to Oct. 1, 2015, 8 pgs.
YouTube; Screenshots of video entitled: "Efficiency and Advances in Thermotherapies Against HLB", publicly available prior to Oct. 1, 2015, 1 pg.
YouTube; Screenshots of video entitled: "Efficiency and Advances in Thermotherapies Against HLB", publicly available prior to Oct. 1, 2015, 5 pgs.
Ehsani, Reza J.; Third Party Submission for U.S. Appl. No. 14/699,156, filed Apr. 29, 2015, dated Jun. 10, 2016, 84 pgs.
U.S.Department of Agriculture; Article entitled: "Proceedings of the Eight Annual Meeting of the Association of Economic Entomologists", Division of Entomology, 1896, 20 pgs.
Davis, Randall James; Non-Final Office Action for U.S. Appl. No. 15/671,563, filed Aug. 8, 2017, dated Sep. 1, 2017, 19 pgs.
Davis, Randall James; Non-Final Office Action for U.S. Appl. No. 14/872,976, filed Oct. 1, 2015, dated Oct. 4, 2017, 39 pgs.
Davis, Randall James; International Preliminary Report on Patentability for PCT No. PCT/US15/53615, filed Oct. 1, 2015, dated Nov. 2, 2017, 11 pgs.
Davis, Randall James; Non-Final Office Action for U.S. Appl. No. 14/843,413, filed Sep. 2, 2015, dated Feb. 26, 2018, 67 pgs.
Davis, Randall James; Requirement for Restriction/Election for U.S. Appl. No. 14/843,413, filed Sep. 2, 2015, dated Dec. 20, 2017, 7 pgs.
Davis, Randall James; Notice of Allowance for U.S. Appl. No. 15/671,563, filed Aug. 8, 2017, dated Dec. 18, 2017, 16 pgs.
Davis, Randall James; Supplemental Notice of Allowance for U.S. Appl. No. 15/671,563, filed Aug. 8, 2017, dated Jan. 16, 2018, 7 pgs.

\* cited by examiner

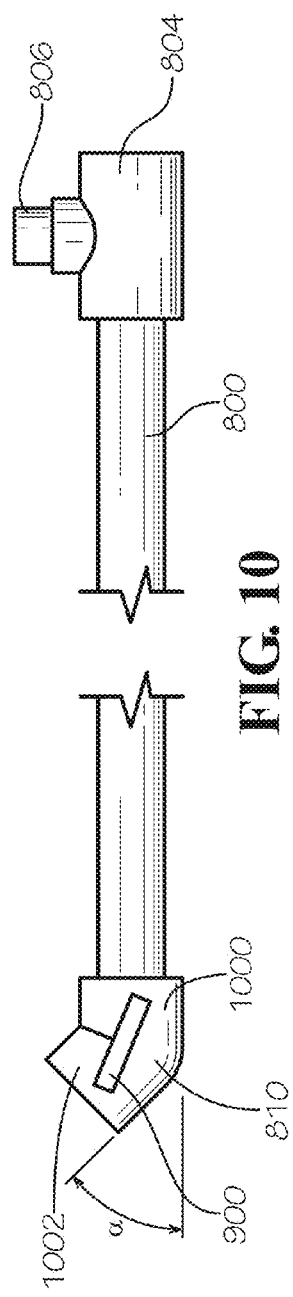
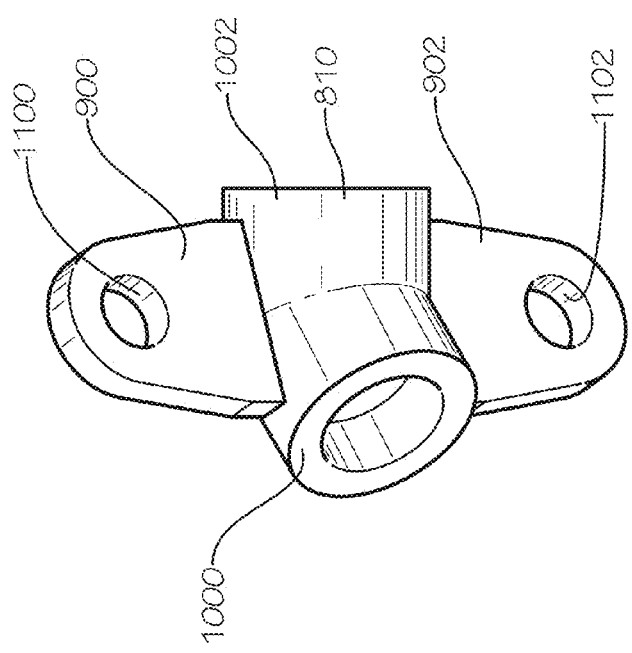
FIG. 10
FIG. 11

CANOPY TREATMENT SYSTEM

REFERENCE TO RELATED APPLICATIONS

This application claims the benefit of U.S. Provisional Application No. 62/152,558, filed Apr. 24, 2015, which is hereby specifically incorporated by reference herein in its entirety.

BACKGROUND

Plants, such as fruit trees and nut trees, may be susceptible to various types of diseases. These diseases may be caused by bacteria, viruses, algae, fungi, chemicals, and various other pathogens and may impact the diseased plant's mortality, health, growth, and reproduction. For example, various diseases, such as Citrus Greening Disease, which is also known as Huanglongbing (HLB), may kill or irreparably damage young plants before reaching reproductive age, affect reproductive output, or directly affect various flowers and fruits of the plant.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 10 illustrates a detailed view of the treatment ring of FIG. 8 taken from detail 10 in FIG. 8 according to aspects of the present disclosure.

FIG. 11 illustrates a perspective view of a vertical connector of the treatment ring of FIG. 8 according to aspects of the present disclosure.

DETAILED DESCRIPTION

Figure 1:
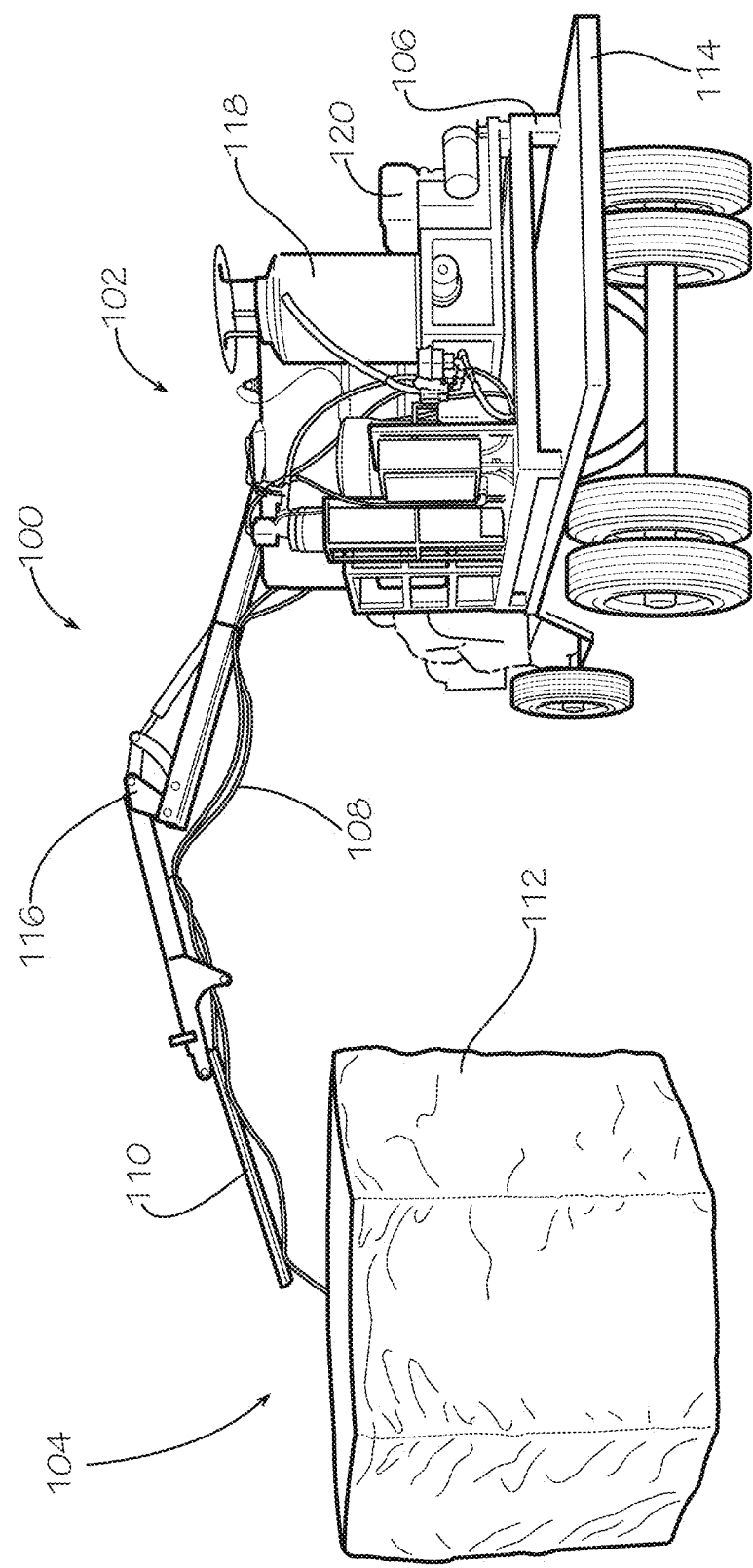
FIG. 1 illustrates a perspective view of a canopy treatment system according to an example of the present disclosure including a hot water generating system and a canopy.

Disclosed is a canopy treatment system and associated methods, systems, devices, and various apparatus. The canopy treatment system includes a mobile base and an extension with a treatment apparatus. It would be understood by one of skill in the art that the disclosed mobile canopy treatment system is described in but a few exemplary embodiments among many.

Plants such as various trees, flowers, bushes, crops, herbs, and various other types of plants may be infected with one or more diseases that may negatively impact the respective plants. For example, diseases may damage or even kill portions of the plants such as branches, leaves, flowers, nuts, and fruits. A non-limiting example of a specific disease affecting plants is the Huanglongbing (HLB) virus, commonly known as the Citrus Greening Disease, which infects citrus plants. HLB affects citrus plants by causing the infected trees to have, for example, stunted growth, bear multiple off-season flowers, most of which fall off, and produce small, irregularly-shaped, and bitter tasting fruit with a portion of the peel that remains green. Controlling diseases such as HLB may be difficult as some diseases may have no known cure and infected plants may be difficult to maintain and keep alive.

The present disclosure describes various methods, systems, devices, and apparatus for treating infected plants with a heated fluid. In one embodiment, a method may include providing a steam environment in which an infected plant is treated. The method may include treating the infected plant at a specific temperature for a specific time such that the disease may be treated without killing the infected plant or damaging existing fruit.

In another embodiment, the canopy treatment system may include a hot water generating system and a canopy. The canopy treatment system may be mobile. The hot water generating system may include a burner and pump. The hot water generating system is configured to generate pressurized and heated fluid that is supplied to the canopy. The hot water generating system is controllable such that the outlet fluid from the hot water generating system is maintained within a particular range of temperatures and pressures.

The canopy is in fluid communication with the hot water generating system and includes a treatment region. During use, the canopy is positioned such that a plant to be treated, such as a tree, is positioned in the treatment region. The disclosure of the tree should not be considered limiting on the current disclosure as in various other embodiments, the plant may be any plant to be treated with the canopy treatment system. The canopy directs the outlet fluid from the hot water generating system around the tree. The canopy at least partially encloses the tree within the treatment region. In various embodiments, the treatment region is defined by a treatment ring. The canopy may be vertically and horizontally positioned relative to the hot water generating system such that the tree is positioned at least partially within the treatment region of the canopy during heat treatment.

The treatment ring may include a nozzle. The nozzle may introduce the heated and pressurized fluid from the hot water generating system into the treatment region. The heated and pressurized fluid may be introduced into the treatment region in a mist form. The nozzle may be orientated such that the heated and pressurized fluid introduced into the treatment region creates a vortex whereby the heated mist is forced to circulate through and around the infected plant.

The canopy treatment system may include a system controller configured to monitor the temperature of the treatment region and shut off the flow of heated fluid through the nozzle when a desired treatment time has been achieved. The system controller may also be configured to monitor a temperature of the infected plant. Exposing the tree to an environment at a specific temperature of a specific time may reduce the rate or amount of disease infection in the tree without killing or irreparably damaging it.

One embodiment of a canopy treatment system 100 is disclosed and described in FIG. 1. The canopy treatment system 100 includes a hot water generating system 102 and a canopy 104.

The hot water generating system 102 pressurizes a fluid, such as water, and heats it under pressure. As described in greater detail below, the pressurized hot water may be recirculated within the hot water generating system 102 until the canopy 104 is positioned. The pressurized hot water may also be recirculated within the hot water generating system 102 until an operator initiates a treatment program through a system controller, as described in greater detail below. The hot water flows to the canopy 104, which includes at least one treatment ring 800 (illustrated in FIG. 8) surrounded by a cover 112, though any number of treatment rings 800, including zero treatment rings 800, may be included in various embodiments. In various embodiments, one operator may position a temperature transmitter 1502a (illustrated in FIG. 15) near the center of the tree trunk and a second operator may lower the canopy 104 over and around the tree. In various embodiments, the canopy 104 is lowered until the canopy 104 rests on the ground. The canopy 104 sprays the fluid as steam or mist on a tree to thoroughly distribute heat within the canopy 104. The second operator may place a second temperature transmitter 1502b (illustrated in FIG. 17) at the next tree trunk while the first tree is being treated with heat treatment in various embodiments. After the heat treatment is completed on the first tree, the canopy 104 is raised, and the canopy treatment system 100 is relocated to the second tree where the process starts again. The temperature transmitters 1502 may be any suitable device capable of generating and transmitting a temperature signal either through wired or wireless communication.

In various embodiments, the hot water generating system 102 includes a hot water generator 118 and pump 120 positioned on a base 106. The hot water generator 118 and pump 120 are in fluid communication with each other and generate a fluid output from the hot water generating system 102 at a specified temperature and pressure. In the present embodiment, the fluid is water and the fluid output is water output; however, in various other embodiments, the fluid may be any desirable fluid or vapor for tree canopy treatment. The hot water generator 118 is adjustable to control the temperature of the water output of the hot water generating system 102. The pump 120 is adjustable to control the pressure of the water output of the hot water generating system 102 in various embodiments. The flow is adjustable through a recirculation valve 1900 (illustrated in FIG. 19), which is downstream of the pump 120. The water output of the hot water generating system 102 is transported to the canopy 104 via hosing 108; however, the disclosure of hosing 108 should not be considered limiting on the current disclosure as in various other embodiments, other connecting mechanisms such as piping, tubing, and various other mechanisms enabling fluid communication between the hot water generating system 102 and the canopy 104 may be utilized.

The canopy 104 includes the treatment ring 800 (illustrated in FIG. 8) and the cover 112 in various embodiments. In various embodiments, the treatment ring 800 sprays the heated water output from the hot water generating system 102 through nozzles 806 (illustrated in FIG. 8) on the treatment ring 800, as is described in greater detail below. In various embodiments, the nozzles 806 on the treatment ring 800 atomize the hot water into steam for heat treatment of the tree to be treated. When the atomized hot water condenses within the canopy 104, heat is released into the air to treat the tree.

The cover 112 is draped around and surrounds the treatment ring 800 to contain moisture and heat within the canopy 104. In various embodiments, the cover 112 includes any material suitable for moisture and heat retention, such as those materials from the group including, but not limited to, various polymers, textiles, plastics, metal sheets, composites, and various other suitable material.

In various embodiments, a jib 110 is connected to the at least one treatment ring 800 through a connection mechanism, such as hooks, hooks and loops, buckles, clasps, pins, bolts, screws, and various other similar connection mechanisms. The jib 110 may be utilized in various embodiments for aiding in raising, lowering, and positioning the canopy 104. In various other embodiments, the jib 110 may be omitted from the canopy 104. In various other embodiments, the canopy 104 may include a plurality of canopies 104 and treatment rings 800 such that the canopy treatment system 100 may treat multiple plants at once.

The canopy treatment system 100 is mobile in various embodiments. In various embodiments, the base 106 provides the mobility for the canopy treatment system 100. In various embodiments, as illustrated in FIG. 1, the base 106 is mounted on a vehicle 114. In the present embodiment, the vehicle 114 is converted from a vehicle used for collecting citrus fruit, which is commonly known as a "goat." In various other embodiments, the base 106 may be mounted on various other types of vehicles, converted vehicles, and various other transporting mechanisms, such as tractors, trucks, or trailers. In various embodiments, the base 106 is equipped with its own movement mechanism and includes a movement mechanism such as wheels, sliders, rollers, or various other movement mechanisms connected to the base 106. In various embodiments, the movement mechanism may be manually driven, automatically driven, or pulled behind another vehicle.

As illustrated in FIG. 1, in various embodiments, the vehicle 114 includes an elevating mechanism 116. In the present embodiment, the elevating mechanism 116 is a hydraulic boom arm mounted on the vehicle 114. The hydraulic boom arm may rotate 360° about the vehicle 114 and hot water generating system 102 and provide vertical and horizontal movement relative to the vehicle 114 and the hot water generating system 102. The canopy 104 is connected to the elevating mechanism 116 and accordingly may be rotated 360° about the vehicle 114 and hot water generating system 102 to various positions around the vehicle 114 and hot water generating system 102. In the present embodiment, the canopy 104 hangs from an end of the hydraulic boom arm. The canopy 104 may also be vertically and horizontally positioned relative to the vehicle 114 and the hot water generating system 102. The elevating mechanism 116 therefore permits the canopy 104 to be moved independently from the hot water generating system 102 without movement of the hot water generating system 102. Independent movement as used herein refers to movement of the canopy 104 without movement of the hot water generating system 102 or movement of the canopy 104 while the hot water generating system 102 remains stationary. The independent movement of the canopy 104 makes the canopy 104 adaptable to treat various sized plants relative to the base 106. In various embodiments, the jib 110 is connected to the elevating mechanism 116 through a connection mechanism such as hooks, hooks and loops, buckles, clasps, pins, bolts, screws, and various other similar connection mechanisms. In various other embodiments, the canopy 104 may be connected to the elevating mechanism 116 without the use of the jib 110. In various embodiments, the elevating mechanism 116 may also be used to guide the hosing 108 from the hot water generating system 102 to the canopy 104. In embodiments where the vehicle 114 or other transporting mechanism does not include an elevating mechanism 116, the canopy 104 may be connected to various other elevating mechanisms, such as lifts, cranes, pulleys, gears, and any other suitable elevating mechanism for selectively raising and lowering the canopy 104 during a treatment process and moving the canopy 104 relative to the hot water generating system 102. The various elevating mechanisms may be part of the vehicle 114 or may be structures, components, or mechanisms independent from the vehicle 114.

Figure 2:
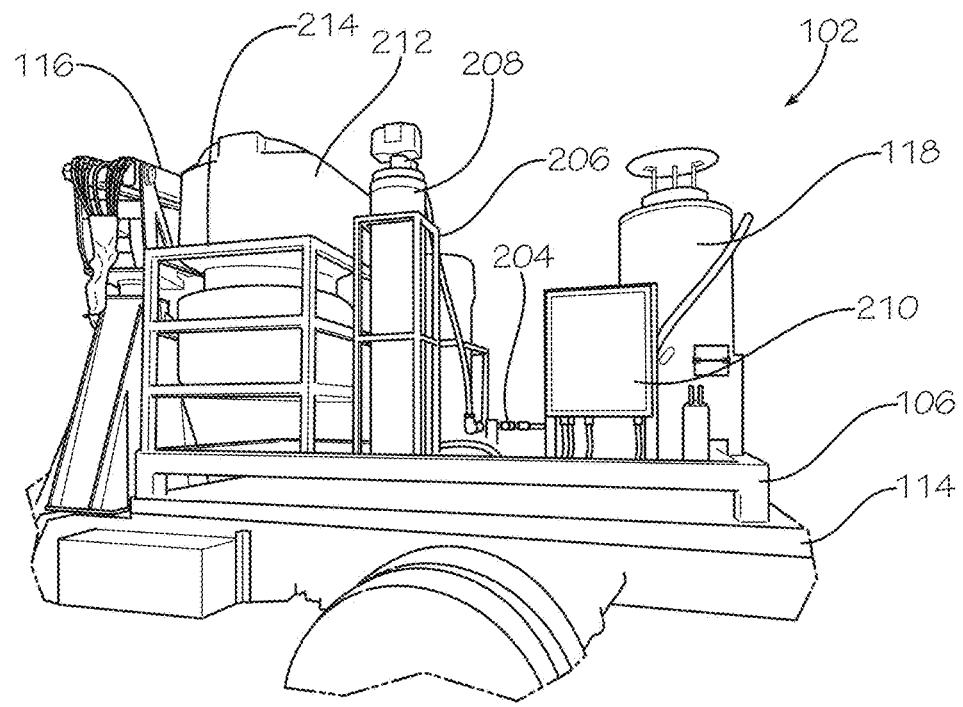
FIG. 2 illustrates a perspective view of the hot water generating system of FIG. 1 positioned on a vehicle according to aspects of the present disclosure.
Figure 3:
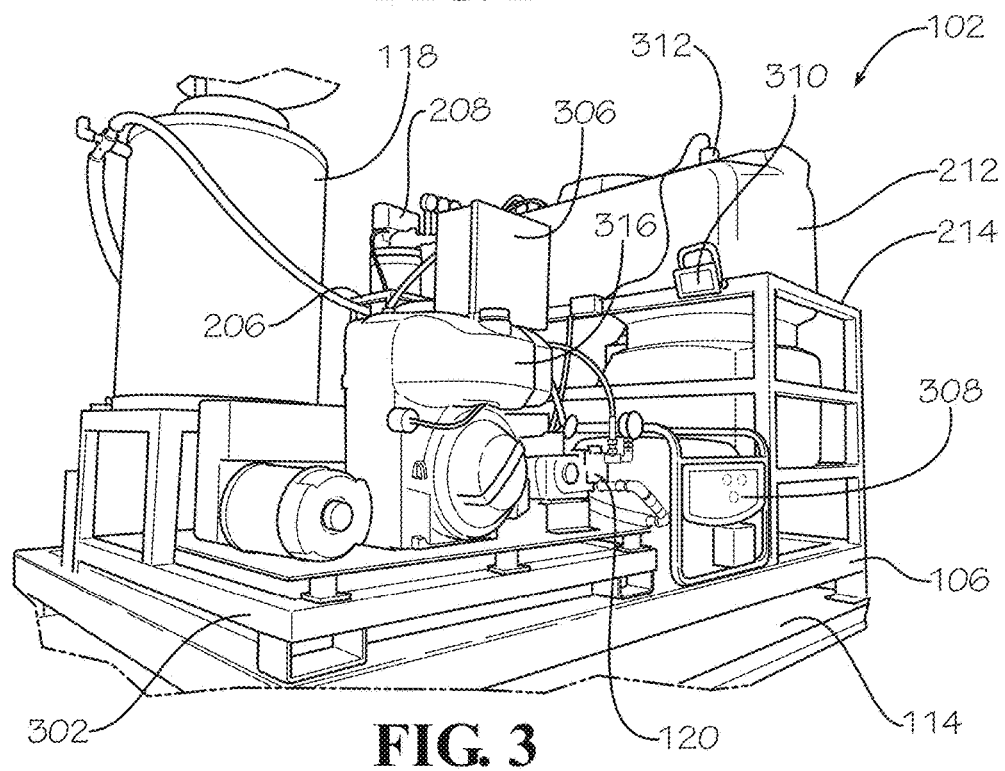
FIG. 3 illustrates another perspective view of the hot water generating system of FIG. 1 according to aspects of the present disclosure.

FIGS. 2 and 3 show the hot water generating system 102 of the canopy treatment system 100. As previously described, the hot water generating system 102 includes the hot water generator 118 and pump 120 positioned on the base 106.

In various embodiments, the base 106 includes a steam generator skid 302. As illustrated in FIGS. 2 and 3, the pump 120 and hot water generator 118 are positioned on the steam generator skid 302 in various embodiments. However, the disclosure of the steam generator skid 302 should not be considered limiting on the current disclosure, as the hot water generator 118 and pump 120 may be positioned as desired on the base 106 in various other embodiments.

In various embodiments, the hot water generator 118 is a liquid fuel fired hot water generator 118 that utilizes a burner 1802 (illustrated in FIG. 18) to heat the fluid, such as water, flowing through the hot water generator 118. In various embodiments, the burner 1802 utilizes a fuel, such as diesel fuel, gasoline, bio-diesel, or other liquid fuel, or propane, or other gaseous fuel to provide heat into the water. For example, the burner 1802 may utilize diesel fuel to burn a flame, and radiant energy from the flame is transferred to the water flowing through the hot water generator 118. The disclosure of diesel fuel should not be considered limiting on the current disclosure. In various other embodiments, the hot water generator 118 is any suitable type of hot water generator 118, such as an electric hot water generator, capable of heating water of the hot water generating system 102.

In various embodiments, the hot water generator 118 is adjustable to heat water to a desired temperature. The hot water generating system 102 is controllable to heat and maintain a desired outlet water temperature. In various embodiments, a system controller automatically controls the hot water generating system 102 to maintain the desired outlet water temperature.

For example, in various embodiments where the canopy treatment system 100 is used to treat the HLB virus, the hot water generator 118 may heat water to at least 230° F. For example, the hot water generator 118 may heat water to temperatures between 210° F. and 260° F., such as between 210° F. and 250° F., such as between 225° F. and 245° F., such as about 235° F. In various embodiments, a temperature between 265° F. and 285° F., such as about 275° F., is a water high temperature limit. In various embodiments, a temperature between 290° F. and 310° F., such as about 300° F., is a water high-high temperature limit. In various embodiments, the operator may program the various water temperature limits. In various other embodiments, the hot water generator 118 may heat water to various other temperatures suitable for treating the HLB virus or other various diseases. In various other embodiments, the hot water generator 118 heats the water to a sufficient temperature such that the canopy 104 heats a diseased tree to a sufficient temperature for treatment. In various embodiments, the hot water generator 118 heats the water to a sufficient temperature such that the canopy 104 is at a temperature between 119° F. and 135° F., such as between 121° F. and 129° F., such as about 125° F. In various embodiments, a temperature between 121° F. and 131° F. is a canopy temperature setpoint. In various embodiments, a temperature between 124° F. and 134° F. is a canopy high temperature limit. In various embodiments, a temperature between 125° F. and 135° F. is a canopy high-high temperature limit. In various other embodiments, the canopy 104 may be heated to other temperatures suitable to treat the tree. The various setpoints and canopy temperature limits may be programmed by the operator in various embodiments.

In various embodiments, the flow of water through the hot water generating system 102 is adjustable through the recirculation valve 1900 to achieve a desired heated fluid temperature. For example, if the hot water generator 118 provides a relatively constant heat source, fluid flowing at a reduced flow rate may be heated to a higher temperature compared to fluid flowing at an increased flow rate through the hot water generator 118. The flow of water may also be controlled to maintain a desired treatment temperature within the canopy 104, which is measured by the temperature transmitter 1502a (illustrated in FIG. 15). In various embodiments, the system controller automatically controls the flow of water to the canopy 104.

In various embodiments, the pump 120 may be in fluid communication with the hot water generator 118, and the pump 120 may be in direct mechanical communication with the engine 316. In various embodiments, the pump 120 could be driven by an electric motor or any similarly suitable device. The pump 120 may be any type of pump suitable for pumping water from a water source, through the hot water generator 118, and to the canopy 104. In various embodiments, the pump 120 adjustably pressurizes the water within the canopy treatment system 100 to a desired pressure or flow. In various embodiments, the pump 120 pumps water to the hot water generator 118 from a water supply source. As illustrated in FIGS. 2 and 3, in various embodiments, the water supply source is a water tank 212 positioned on the base 106 and in fluid communication with the pump 120 and hot water generator 118. The pump 120 supplies water from the water tank 212 to the hot water generator 118 and then to the canopy 104, where it is used for heat treatment of the tree. The water tank 212 is described in greater detail below. In various other embodiments, the water supply source is external to the hot water generating system 102. As illustrated in FIGS. 2 and 3, in various embodiments, the base 106 includes a tank railing 214 for retaining the water tank 212 on the base 106; however, the disclosure of the tank railing 214 should not be considered limiting on the current disclosure.

In addition to the hot water generator 118 and the pump 120, in various embodiments, the hot water generating system 102 includes additional components utilized with the canopy treatment system 100.

The hot water generating system 102 includes the water tank 212 in various embodiments, which is utilized to store a supply of the fluid, such as hard water or soft water depending on the application, for the canopy treatment system 100. Depending on the storage capacity of the water tank 212, the water tank 212 may be refilled periodically during operation of the canopy treatment system 100. The number of water tanks 212 should not be considered limiting on the current disclosure.

As illustrated in FIG. 3, in various embodiments, the water tank 212 includes a water level transmitter 312, which is configured to measure the water level within the water tank 212. The water level transmitter 312 is in electrical communication with the system controller, which may be programmed with a tank low level alarm. In various embodiments, when the water level transmitter 312 detects that a water level within the tank 212 is below a predetermined water level, the tank low level alarm alerts the operator of the need to fill the water tank 212. In various embodiments, a low water level measured by the water level transmitter 312 may prevent the pump 120 of the supply portion 102 from starting until the water level in the water tank 212 is above the predetermined water level. The number of water level transmitters 312 should not be considered limiting on the current disclosure as in various other embodiments, any number of water level transmitters 312, including zero water level transmitters 312, may be utilized.

As illustrated in FIG. 2, in various embodiments, the hot water generating system 102 includes a pressure regulator 204. In various embodiments, the pressure regulator 204 regulates outlet pressure from the pump 120 at safe and usable pressures. The pressure regulator 204 may be positioned between the pump 120 and the hot water generator 118. The pressure regulator 204 may be positioned on the base 106 in various embodiments, as illustrated in FIG. 2. In various embodiments, the recirculation valve 1900 may be used to recirculate fluid to the water tank, thereby regulating pressure within the hot water generating system 102 without a separate pressure regulator.

As illustrated in FIGS. 2 and 3, in various embodiments, the hot water generating system 102 includes a water softener 208. The water softener 208 may be utilized to remove calcium, magnesium, and other metals or ions in hard water to extend the lifetime of the various components of the canopy treatment system 100. In various other embodiments, the water softener 208 may be omitted from the hot water generating system 102. In various other embodiments, water softening is performed external to the hot water generating system 102, and soft water is supplied to the water tank 212 for use with the canopy treatment system 100. In various embodiments, the water softener and tanks may be located on a separate skid, which may be self-propelled or attached mechanically to vehicle 114, in fluid communication with pump 120. In various embodiments, the water softener may include a multi-media filter to remove suspended solids from the incoming water. In various embodiments, other water treatment equipment and chemicals may be used to treat the incoming water source such that it is suitable for use as boiler feedwater. In various other embodiments, the canopy treatment system 100 may use hard water. Similar to the tank railing 214, the base 106 may include a water softener railing 206 for retaining the water softener 208 on the base 106.

Figure 18:
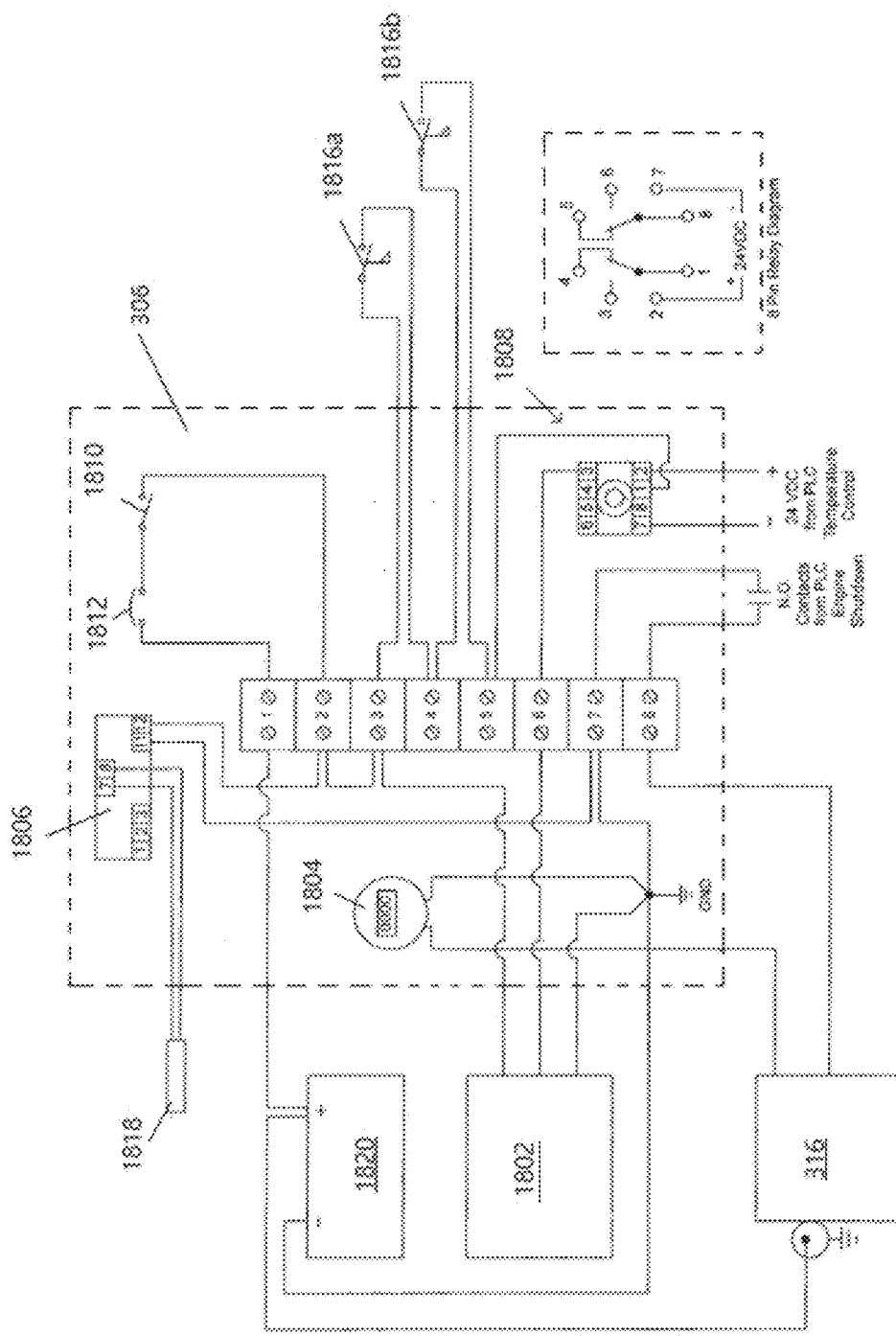
FIG. 18 is an electrical schematic for the canopy treatment system of FIG. 1 according to aspects of the present disclosure.

As illustrated in FIG. 3, in various embodiments, the hot water generating system 102 includes a burner control wiring enclosure 306 on the base 106. In various embodiments, the burner control wiring enclosure 306 includes a burner controller (not illustrated) and controls for various components of the hot water generating system 102, such as the hot water generator 118, pump 120, and various other components. As illustrated in FIG. 18, the burner control wiring enclosure 306 includes a burner on/off switch 1810, a start/stop relay 1808 for a signal from the system controller, a visual temperature display 1806, and an hour meter 1804 in various embodiments.

As illustrated in FIG. 3, in various embodiments, the hot water generating system 102 includes an engine 316 for supplying energy to components of the hot water generating system 102, such as the pump 120, hot water generator 118, and various other components. In various embodiments, the engine 316 is utilized to drive the pump 120. The engine 316 may also be utilized to charge a battery 1820 (illustrated in FIG. 18) through an alternator (not illustrated). In various embodiments, the battery 1820 may be utilized to provide power to the burner 1802 of the hot water generator 118. The burner 1802 and engine 316 may be interconnected in various embodiments such that the burner 1802 may not start, and thereby the hot water generator 118 does not heat the water, unless the engine 316 is running.

In various embodiments, the hot water generating system 102 includes a controller enclosure 210 as illustrated in FIG. 2. The controller enclosure 210 includes the system controller, which is in electrical communication with the various components of the hot water generating system 102 and the canopy 104. The system controller is a Programmable Logic Controller (PLC) in various embodiments, which the operator may program to control the temperature and pressure of the hot water output of the hot water generating system 102 and the duration of the flow in the canopy 104 through a treatment technique. In various embodiments, the system controller is in electrical communication with a user device 3008 having a Human Machine Interface (HMI) 3010, both of which are illustrated in FIGS. 30-33, and are described in greater detail below. The user device 3008 may enable the operator to view a graphic representation of information concerning the canopy treatment system 100 and run the treatment technique via the system controller. In various treatment environments, a treatment temperature and treatment duration time are controlled to treat the tree without irreparably damaging or killing the tree. For example, the system controller may be configured to shut off the flow of fluid through the nozzle 806 when a desired treatment time at a desired treatment temperature has been achieved. In various embodiments, the treatment temperature may be any temperature within a range of temperatures, a temperature at or above a certain temperature, or within a desired tolerance range above and/or below the canopy temperature setpoint. In various embodiments, the treatment duration time may be between 0 and 180 seconds. In an example, the treatment may occur for a treatment duration time of approximately 30 seconds at a canopy temperature setpoint of 126° F. In examples, the treatment duration time may vary based on different canopy sizes. In various embodiments, the treatment duration time is no longer than 3 minutes. In various other embodiments, the treatment duration time may be any time suitable for heat treating the tree. In various other embodiments, the water temperature, pressure, and treatment duration time may be manually controlled. In various embodiments, the system controller also incorporates various interlocks such as tank level, flow, temperature, pressure, and various other interlocks to protect the pump 120, the hot water generator 118, various other equipment, and the treated tree or plants from potential damaging situations.

As illustrated in FIG. 3, in various embodiments, the hot water generating system 102 includes an electric generator 308. In various embodiments, the electric generator 308 may be utilized to power the system controller and provide power to lights 310. In various embodiments, the lights 310 are mounted on the tank railing 214; however, the location of the lights 310 should not be considered limiting on the current disclosure. Additionally, the number of lights 310 should not be considered limiting as in various other embodiments, any number of lights, including zero lights, may be utilized. The disclosure of the electric generator 308 should not be considered limiting on the current disclosure as in various other embodiments, the electric generator 308 may be omitted and the hot water generating system 102 may have a single power generator, such as the engine 316, or no power generator or power source.

Figure 4:
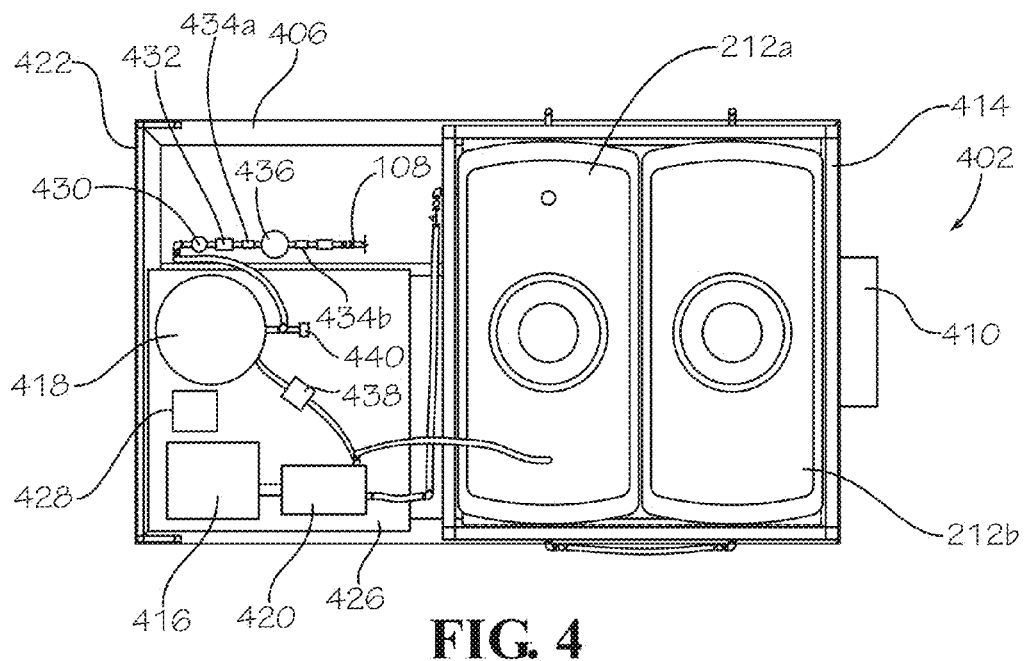
FIG. 4 illustrates a top view of another example of a hot water generating system according to aspects of the present disclosure.

FIGS. 4-7 show another embodiment of a hot water generating system 402. As illustrated in FIGS. 4-7, the hot water generating system 402 includes a hot water generator 418, which may be functionally similar to the hot water generator 118, and a pump 420, which may be functionally similar to the pump 120. In various embodiments, the hot water generating system 402 also includes: a base 406, which may be functionally similar to the base 106; a tank railing 414, which may be functionally similar to the tank railing 214; the controller enclosure 410, which may be functionally similar to the controller enclosure 210; a steam generator skid 426, which may be functionally similar to the steam generator skid 302; a burner control wiring enclosure 428, which may be functionally similar to the burner control wiring enclosure 306, and an engine 416, which may be functionally similar to the engine 316. As illustrated in FIG. 4, the hot water generating system 402 includes two water tanks 212*a,b*. The water tank 212*a* is a first water tank and the water tank 212*b* is a second water tank in fluid communication with the water tank 212*a*. The second water tank 212*b* increases the capacity of fluid stored on a base 406 in various embodiments. The second water tank 212*b* also allows one of the water tanks 212 to be filled while the other is being used.

Figure 5:
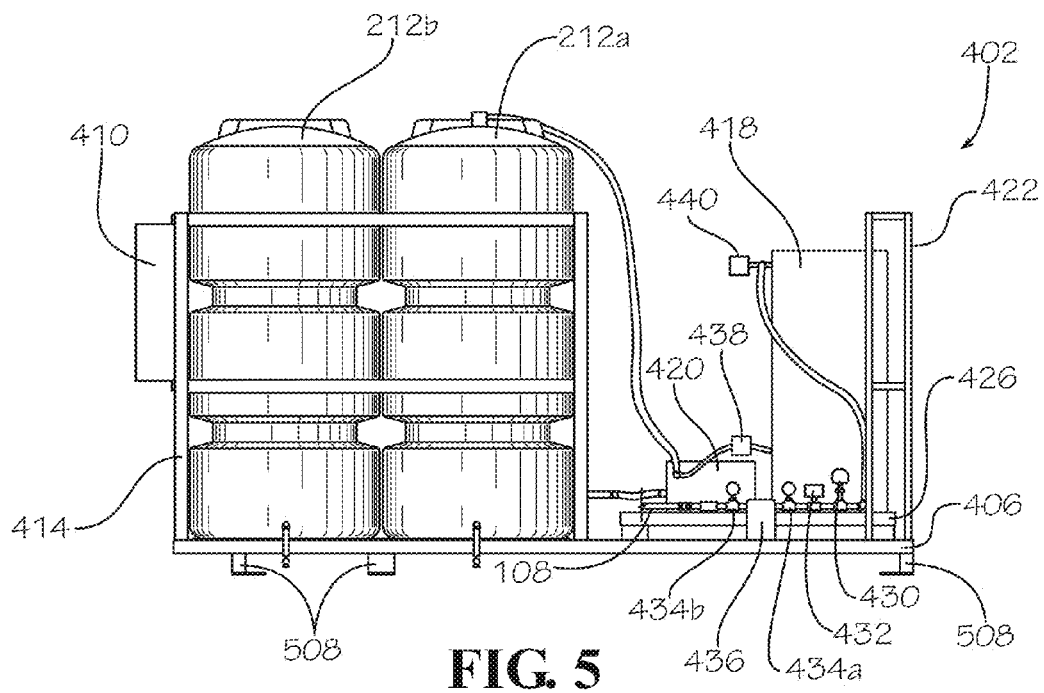
FIG. 5 illustrates a side view of the hot water generating system of FIG. 4 according to aspects of the present disclosure.

In various embodiments, the base 406 also includes a generator railing 422. In various embodiments, the generator railing 422 provides protection for the components of the hot water generating system 402, such as the hot water generator 418 and the pump 420. As illustrated in FIGS. 4 and 5, in various embodiments, the hot water generating system 402 includes equipment for monitoring various aspect of the hot water generating system 402. The hot water generating system 402 includes a heater temperature probe 440, a canopy valve 432, inlet and outlet pressure gauges 434*a,b*, a strainer 436, and a flow meter 438. The order of the heater temperature probe 440, canopy valve 432, pressure gauges 434*a,b*, strainer 436, and flow meter 438 should not be considered limiting on the current disclosure.

In various embodiments, the heater temperature probe 440 is configured to detect the temperature of the water exiting the hot water generator 418. The heater temperature probe 440 may be in electrical communication with a burner control wiring enclosure, which may be functionally similar to the burner control wiring enclosure 306, to display the temperature of the water on a temperature display (not illustrated), which may be functionally similar to the visual temperature display 1806. In various embodiments, a second water temperature probe 430 in the hot water generator outlet header may be in communication with the PLC. The operator may use the information from the temperature probe 430 to control the temperature of the water output from the hot water generator 418 to maintain a desired outlet water temperature. The number of temperature probes 430 should not be considered limiting on the current disclosure.

The canopy valve 432 is utilized to control the flow of the pressurized hot water from the hot water generator 418 to the canopy 104. The canopy valve 432 may be actuated between a closed position, where fluid flow between the hot water generating system 402 and the canopy 104 is prevented, and an open position, where fluid flow between the hot water generating system 402 and the canopy 104 is permitted. In various embodiments, the canopy valve 432 may be automatically controlled through the system controller, which may selectively open and close the canopy valve 432 during heat treatment of the tree. In various other embodiments, the canopy valve 432 may be manually controlled by the operator. In various other embodiments, the canopy valve 432 may be automatically positioned in a position other than open or closed by the PLC control signal or manually positioned. In various embodiments, the heated water is recirculated via a recirculation valve, which may be functionally similar to the recirculation valve 1900, from the hot water generating system 402 to the tanks 212a,b until the canopy valve 432 is opened.

The strainer 436 may be used to capture unwanted particles, such as rust or other debris, from within the hot water generating system 402. The strainer 436 may accordingly be drained periodically to prevent the buildup of any unwanted particles. In various embodiments, the hot water generating system 402 includes the inlet and outlet pressure gauges 434a,b for measuring the pressure differential across a strainer 436. In various other embodiments, a single differential pressure gauge may replace the inlet and outlet pressure gauges, 434a,b. In various embodiments, when the pressure differential is above a predetermined value, the strainer 436 may be drained to prevent the buildup of unwanted particles, such as rust, within the water.

The flow meter 438 may be configured to take flow rate readings of the water exiting the hot water generator 418. The flow meter 438 may be in electrical communication with the system controller and may transmit the flow rate readings to the system controller. The operator may adjust a fluid flow rate to achieve a desired flow through the hot water generating system 402 based on the readings from the flow meter 438. In various embodiments, the operator may adjust the recirculation valve to adjust the flow of water returning to the water tanks 212, and thereby adjust the flow rate of the water discharge to the canopy 104. Because different sized or dimensioned treatment rings 800 may utilize different flow rates, the adjustability of the flow rate to the canopy 104 may allow the hot water generating system 402 to accommodate various sized treatment rings 800 at desired flow rates.

Figure 6:
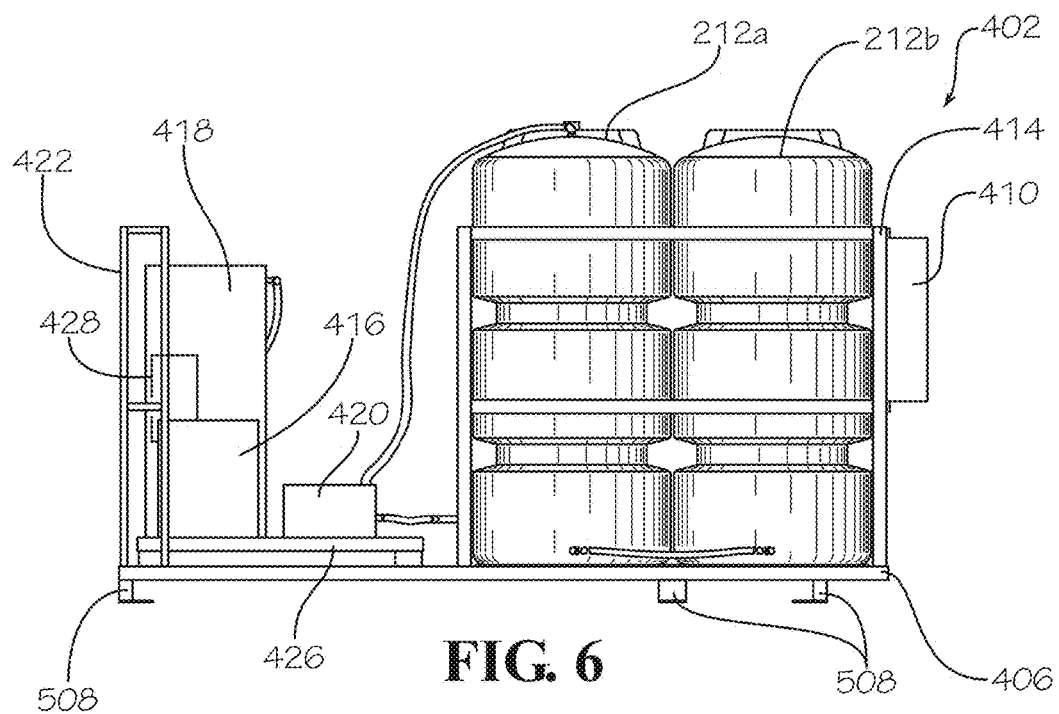
FIG. 6 illustrates another side view of the hot water generating system of FIG. 4 according to aspects of the present disclosure.
Figure 7:
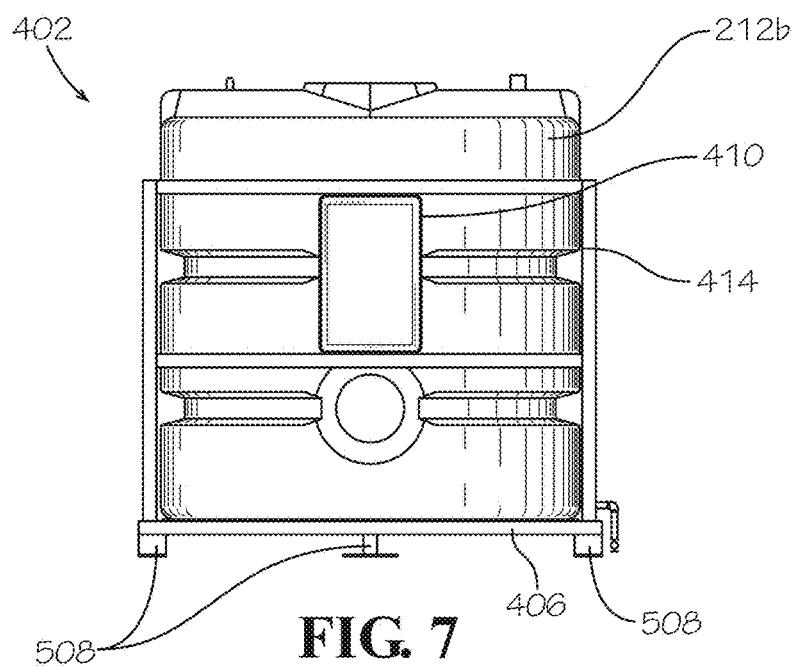
FIG. 7 illustrates a front view of the hot water generating system of FIG. 4 according to aspects of the present disclosure.

As illustrated in FIGS. 4-7, in various embodiments, the controller enclosure 410 is mounted on the tank railing 414. In various embodiments, the base 406 includes feet 508 as illustrated in FIGS. 5-7. In various embodiments, the feet 508 may be utilized to position and support the base 406 on the vehicle 114 illustrated in FIG. 1. Through the feet 508, the hot water generating system 402 may define space between the base 406 and the vehicle 114, which may be utilized to route various electrical components or piping components such as various hoses, tubing, or other components.

Figure 8:
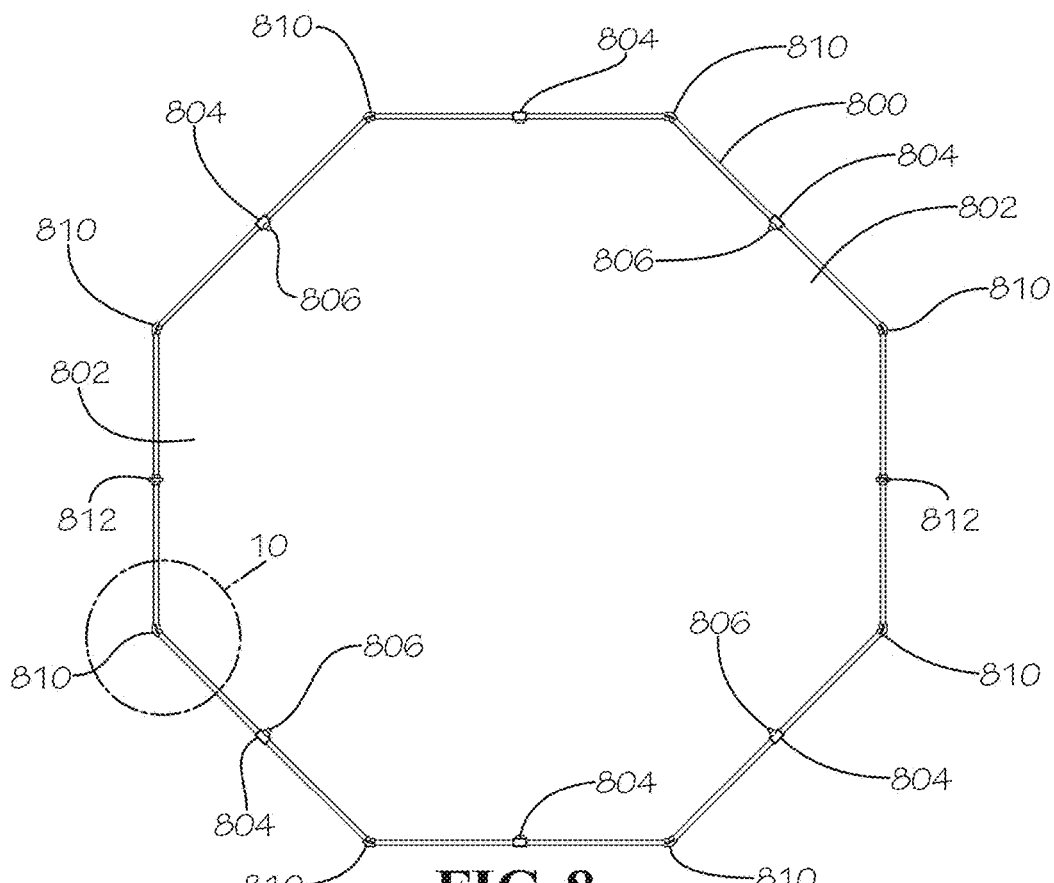
FIG. 8 illustrates a top view of a treatment ring of the canopy of FIG. 1 according to aspects of the present disclosure.
Figure 9:
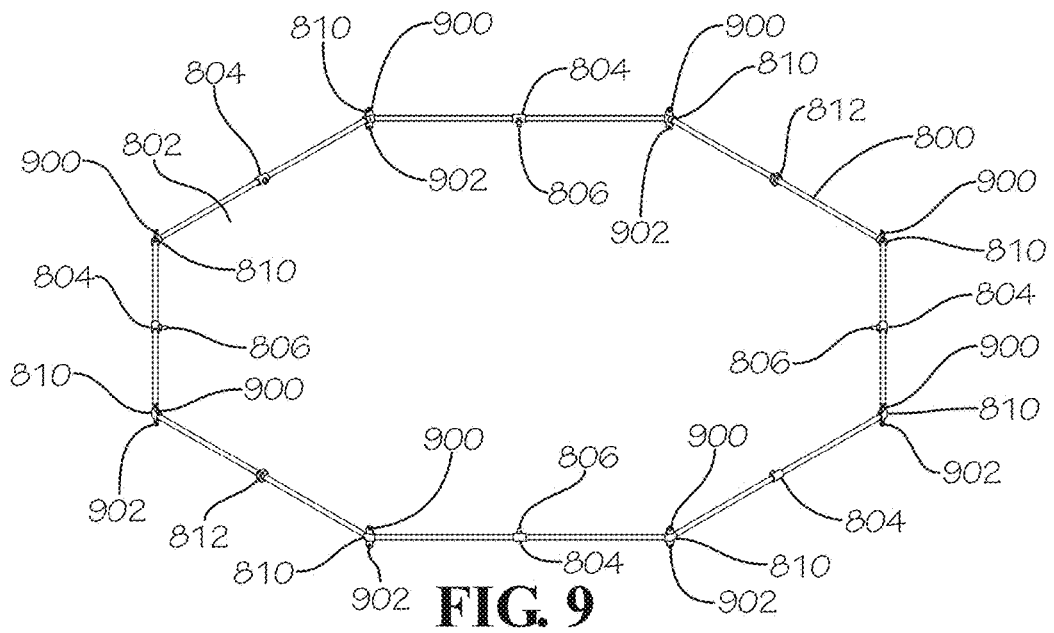
FIG. 9 illustrates a perspective view of the treatment ring of FIG. 8 according to aspects of the present disclosure.

FIGS. 8 and 9 illustrate an example of the treatment ring 800 of the canopy 104. In various embodiments, the treatment ring 800 is shaped such that the treatment ring 800 may surround the tree or plant to be treated. The treatment ring 800 may be shaped to surround the tree while reducing void spaces within the treatment ring 800, which are spaces within the treatment ring 800 that are not filled by the tree. Reducing the amount of void space may increase the energy efficiency of the canopy treatment system 100 because less heated air is wasted in the void spaces. As illustrated in FIG. 8, in various embodiments, the treatment ring 800 is an octagon shape. However, the treatment ring 800 may be any desired shape in various other embodiments, such as a rectangular shape (illustrated in FIG. 17), an annular shape such as a circle, or any other desired shape.

The treatment ring 800 may have a width such that the treatment ring 800 surrounds the tree while reducing the amount of void space. For example, in various embodiments, a width of the treatment ring 800 may be between 7 feet and 11 feet when the canopy treatment system 100 is used to treat citrus trees. In various other embodiments, the treatment ring 800 may have any desired width.

In various embodiments, the treatment ring 800 is constructed from a number of segments of piping; however, in various other embodiments, the treatment ring 800 may be a single continuous pipe. The disclosure of piping should not be considered limiting on the current disclosure as in various other embodiments, the treatment ring 800 is constructed from tubes, pipes, hoses, or various other similar components or combinations thereof enabling fluid flow through the treatment ring 800. In various embodiments, the treatment ring 800 is constructed from various types of pressure piping. For example, in various embodiments the treatment ring 800 is constructed from pressure piping enabled to hold a fluid of a system that operates at about 110 psig. In various embodiments, the pressure at which the tree canopy treatment system operates may be less than the maximum pressure that the pressure piping may hold. The type of pressure piping used may be varied depending on the particular application.

As illustrated in FIGS. 8 and 9, in various embodiments, the enclosed area of the treatment ring 800 defines the treatment region 802. During heat treatment of a tree, the canopy treatment system 100 positions the canopy 104 such that the tree is within the treatment region 802. In various embodiments, the treatment ring 800 includes fluid connectors 804. In various embodiments, the treatment ring 800 includes at least one spray nozzle 806 connected to at least one fluid connector 804. The fluid connectors 804 may be a fitting, may be a threaded connector that connects with the piping of the treatment ring 800, may be welded to the piping of the treatment ring 800, or may be connected to the treatment ring 800 through various other suitable mechanisms. Nozzles 806 may be placed at various locations on the treatment ring 800 to enable a quick and uniform heating of the tree while within the canopy 104. In various embodiments, the spray nozzles 806 are orientated to direct fluid into the treatment region 802. In the present embodiments, the treatment ring 800 includes six fluid connectors 804 and four spray nozzles 806; however, the number of fluid connectors 804 or the number of spray nozzles 806 should not be considered limiting on the current disclosure.

In various embodiments, the fluid connectors 804 without spray nozzles 806 are either connected to the hosing 108, which is connected to the hot water generating system 102 as illustrated in FIG. 1, connected to inter-ring hosing 1208 (illustrated in FIG. 12), or the fluid connectors 804 are plugged. In various embodiments, hosing 108 provides fluid communication between the treatment ring 800 and the hot water generating system 102, and the inter-ring hosing 1208 provides fluid communication between multiple treatment rings 800 when the canopy 104 includes more than one treatment ring 800.

In various embodiments, the spray nozzle 806 may be selected from the group of nozzles including, but not limited to, full cone spray nozzles, hollow cone spray nozzles, fan spray nozzles, misting spray nozzles, air atomizing spray nozzles, special purpose spray nozzles, and various other types of spray nozzles. In various embodiments, a single treatment ring 800 may include at least two different types of spray nozzles 806. In various embodiments with more than one treatment ring 800, the spray nozzle 806 on one treatment ring 800 may be a different spray nozzle type from a spray nozzle 806 on another treatment ring 800. The configuration, number, type, or location of the spray nozzles 806 or the fluid connectors 804 on the treatment rings 800 should not be considered limiting on the current disclosure. In various embodiments, the number, location, or type of spray nozzles 806 may be varied depending on a particular use of the canopy treatment system 100. For example, in various embodiments, different spray nozzles 806 may be utilized to develop different spray patterns within the treatment region 802 for optimum heat distribution throughout the canopy 104. In various embodiments, the number, location, and type of spray nozzles 806 may be dependent on the type of canopy 104. For example, a canopy 104 with a 7 foot diameter may have nozzles 806 different from the spray nozzles 806 of a canopy 104 with a 10 foot diameter.

In aspects of the present disclosure, the spray nozzles 806 atomize the heated fluid from the hot water generating system 102 to create steam or mist. In various embodiments, the spray nozzles 806 are orientated such that the fluid flow through the spray nozzles 806 creates a vortex of steam in the treatment region 802. Accordingly, the spray nozzles 806 circulate the steam around and through various portions of the tree for an approximately even distribution of the fluid within the canopy 104.

Figure 12:
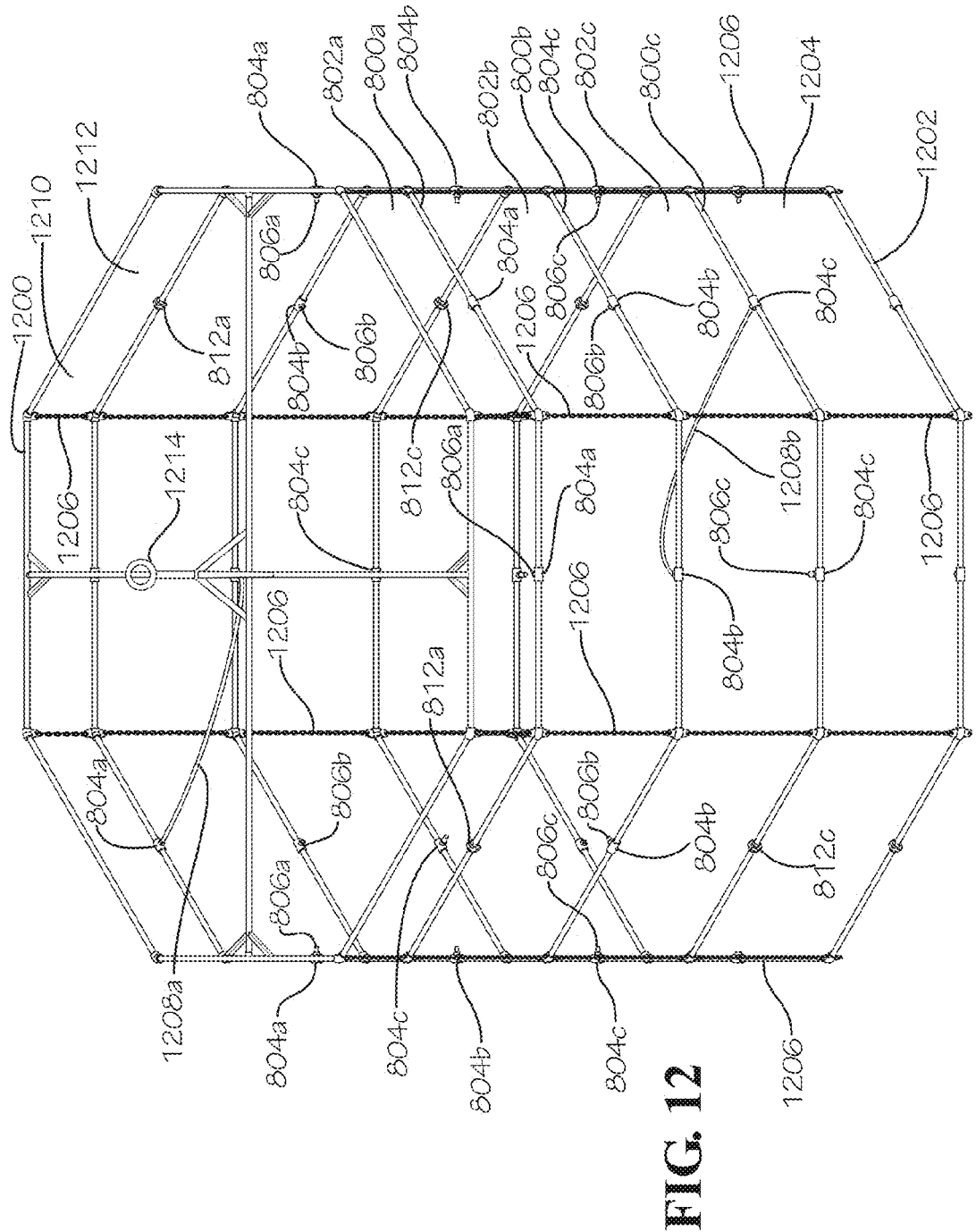
FIG. 12 illustrates a perspective view of a support ring, treatment ring, and base ring of the canopy of FIG. 1 according to aspects of the present disclosure.

As illustrated in FIGS. 8 and 9, in various embodiments, the treatment ring 800 includes vertical connectors 810. As illustrated in FIG. 9, in various embodiments, the vertical connectors 810 include a top connector 900 and a bottom connector 902. In various embodiments where the canopy 104 includes more than one treatment ring 800, as illustrated in FIG. 12 and described in greater detail below, the vertical connectors 810 provide mechanical connections enabling adjacent treatment rings 800 to be vertically connected. As described in greater detail below, in various embodiments, adjacent treatment rings 800 may be connected to each other through various support mechanisms. In various other embodiments, the connectors 810 may be formed on other components of the treatment ring 800, such as the fluid connectors 804, the ring unions 812, the pipes of the treatment ring 800 themselves, or various other components and suitable combinations thereof. In addition, in various embodiments, the vertical connectors 810 may be positioned at other location on the treatment ring 800 and do not necessarily have to be in corners of the treatment ring 800. In various other embodiments, some vertical connectors 810 may only have top connectors 900 or bottom connectors 902. For example, in various embodiments, the vertical connectors 810 of the lower-most treatment ring 800 or the base ring 1202 may only have top connectors 900.

As illustrated in FIGS. 8 and 9, the treatment ring 800 may include ring unions 812. In various embodiments where the treatment ring 800 is constructed from segments of piping or tubing, the ring unions 812 may connect the segments of piping or tubing in place of the fluid connectors 804. The ring unions 812 may be easily connected and disconnected in various embodiments such that the treatment ring 800 may be easily assembled and disassembled for easy transport of the treatment ring 800 if desired by the operator. The use of ring unions is not intended to be limiting, and other mechanical connections could be used (e.g., flanges, etc.).

FIG. 10 illustrates a portion of the treatment ring 800 taken from detail 10 in FIG. 8. As illustrated in FIG. 10, the vertical connector 810 includes a first portion 1000 and a second portion 1002 angled relative to the first portion 1000 at an angle $\alpha$. In various embodiments, angle $\alpha$ may be any desired angle depending on the desired shape of the treatment ring 800. In various embodiments, the angle $\alpha$ may be 45° when the treatment ring 800 is octagon-shaped. FIG. 10 also illustrates the spray nozzle 806 connected to the fluid connector 804.

FIG. 11 is a perspective view of the vertical connector 810. As illustrated in FIG. 11, in various embodiments, the top connector 900 defines a top connecting bore 1100 as a connecting mechanism and the bottom connector 902 defines a bottom connecting bore 1102 as a connecting mechanism. The disclosure of connecting bores 1100, 1102 should not be considered limiting on the current disclosure as in various other embodiments, the connection mechanism may be selected from the group of connecting mechanisms including, but not limited to, hooks, hooks and loops, buckles, clasps, pins, bolts, screws, and various other connecting mechanisms. In various embodiments, the connecting bores 1100, 1102 may connect with the various vertical support mechanisms enabling vertical mechanical connection between adjacent treatment rings 800.

FIG. 12 illustrates a plurality of treatment rings 800, a support ring 1200, and a base ring 1202 of the canopy 104. In the present embodiment, the canopy 104 includes three treatment rings 800a,b,c; however, the number of treatment rings 800 included with the canopy 104 should not be considered limiting on the current disclosure. As illustrated in FIG. 12, the treatment rings 800a,b,c of the canopy 104 are aligned such that the treatment regions 802a,b,c of each ring 800a,b,c, respectively, are offset. In various embodiments, the spray nozzles 806b of the treatment ring 800b are different from the spray nozzles 806a,c of the treatment rings 800a,c, respectively. In various embodiments, the spray nozzles 806b are cone nozzles and the spray nozzles 806a,c are fan nozzles. In various embodiments, the base ring 1202 defines a bottom opening 1204. In various embodiments, the aligned treatment regions 802 and bottom opening 1204 define a canopy treatment region 1212. In various embodiments, the tree to be treated is positioned in the canopy treatment region 1212 during heat treatment.

As illustrated in FIG. 12, according to various aspects, the canopy 104 includes the inter-ring hosing 1208 between adjacent rings 800 such that rings 800a,b,c are in fluid communication with each other. In various embodiments, the inter-ring hosing 1208a,b is connected to fluid connectors 804a,b,c, of each treatment ring 800a,b,c, respectively, that are without spray nozzles 806 and enables fluid communication between the multiple treatment rings 800a,b,c. As illustrated in FIG. 12, the hosing 1208a connects the treatment ring 800a with the treatment ring 800b such that the treatment rings 800a,b are in fluid communication, and the hosing 1208b connects the treatment ring 800b with the treatment ring 800c such that the treatment rings 800b,c are in fluid communication such that the hosing 1208a and hosing 1208b connect to treatment ring 800b with fluid connector 804b located 180° apart. This provides even pressure drop inside ring 800b. The disclosure of inter-ring hosing 1208 should not be considered limiting as in various other embodiments, the treatment rings 800 are in fluid communication with each other through piping, tubing, or any other suitable mechanism for fluid communication. In embodiments with a single treatment ring 800, the inter-ring hosing 1208 may be excluded from the canopy 104.

In various embodiments, one of the plurality of treatment rings 800a,b,c, such as the treatment ring 800a, is connected to the hosing 108 (not illustrated in FIG. 12). In various embodiments, the hosing 108 is connected to one of the fluid connectors 804a without a spray nozzle 806a and that is on opposite side of 800a where the inter-ring hosing 1208a is connected. In various embodiments, the hosing 108 enables fluid communication between the treatment rings 800 and the hot water generating system 102 such that the hot and pressurized fluid generated by the hot water generating system 102 is transported to the treatment rings 800.

As illustrated in FIG. 12, in various embodiments, in addition to the treatment rings 800, the canopy 104 includes the support ring 1200 and the base ring 1202. The number, location, or shape of any of the treatment ring 800, support ring 1200, or base ring 1202 should not be considered limiting on the current disclosure as in various embodiments, the treatment rings 800, support ring 1200, or base ring 1202 may have any desired shape, number, or location.

In various embodiments, the treatment rings 800, support ring 1200, and base ring 1202 are mechanically connected to each other through support mechanisms 1206. In various embodiments, the support mechanisms 1206 may be various support mechanisms including, but not limited to, ropes, cables, chains, rods, beams, and various other support mechanisms enabling mechanical connectivity between the various rings 800, 1200, 1202 of the canopy 104. In various embodiments, instead of a series of chains between the rings 800, 1200, 1202, the support mechanisms 1206 may be a single long chain at the peripheral positions to which the rings 800, 1200, 1202 are attached. In various embodiments, instead of a series of chains or a single long chain, a single cable maybe used. In various embodiments, the support mechanisms 1206 are collapsible or extendable such that a distance between adjacent rings may be varied. Various collapsible or extendable support mechanisms 1206 include, but are not limited to, telescoping rods, telescoping beams, ropes, cables, chains, and various other similar support mechanisms.

The height of the canopy 104 is defined as a distance from the top ring of the canopy 104, such as the support ring 1200, to the bottom ring of the canopy 104, such as the base ring 1202. In various other embodiments, the top ring may be one treatment ring 800 or the bottom ring may be one treatment ring 800. In various embodiments utilizing collapsible or extendable support mechanisms 1206, the height of the canopy 104 may be varied between an extended height (illustrated in FIG. 15) and a collapsed height (illustrated in FIG. 13). In various embodiments, the height of the canopy 104 at the extended height is greater than the height of the canopy 104 at the collapsed height. In various other embodiments, the support mechanisms 1206 are rigid such that a distance between adjacent rings may not be varied. Various rigid support mechanisms 1206 include non-telescoping rods, beams, and various other similar support mechanisms. In the present embodiment, the support mechanisms 1206 are chains.

In various embodiments, the support ring 1200 includes a support connector 1214 that may connect to the jib 110. In various embodiments, the jib 110 is connected to the support connector 1214 through a connection mechanism (not illustrated) such as hooks, shackles, hooks and loops, buckles, clasps, pins, bolts, screws, and various other similar connection mechanisms.

As illustrated in FIG. 12, in various embodiments, the support ring 1200 defines a top opening 1210 in a center portion of the support ring 1200. In various embodiments, the base ring 1202 is a weighted ring. In various embodiments, the base ring 1202 is identical to the treatment rings 800 but is without any spray nozzles 806 or connecting hoses 1208. In various embodiments where the support mechanisms 1206 are collapsible or extendable, the base ring 1202 may aid in varying the height of the canopy 104 between the collapsed height and the extended height. In various embodiments, the canopy 104 may be in the collapsed state to allow for easier transport.

In various embodiments, the cover 112 illustrated in FIG. 1 is draped around and surrounds the treatment rings 800. The cover 112 may also surround the support ring 1200 and may also surround the base ring 1202 in various embodiments. In various embodiments, the cover 112 also covers the top opening 1210 of the support ring 1200. The cover 112 is utilized to contain moisture and heat within the canopy treatment region 1212 of the canopy 104. In various embodiments, the cover 112 includes sealable flaps (not illustrated). The sealable flaps may be utilized by the operator to cover or uncover the top opening 1210, which may aid in temperature control within the treatment region 1212 during varying ambient conditions. By covering the top opening 1210, the canopy 104 traps heat within the treatment region 1212 during both heat treatment and during movement of the canopy 104 when the sealable flaps are closed or when the sealable flaps are omitted. The canopy 104 trapping heat during both heat treatment and movement reduces the amount of heat lost from the canopy 104 while the canopy 104 is moved from one tree to the next tree to be treated and accordingly reduces the amount of time needed to heat the treatment region 1212 back up to temperatures to treat the trees.

Figure 13:
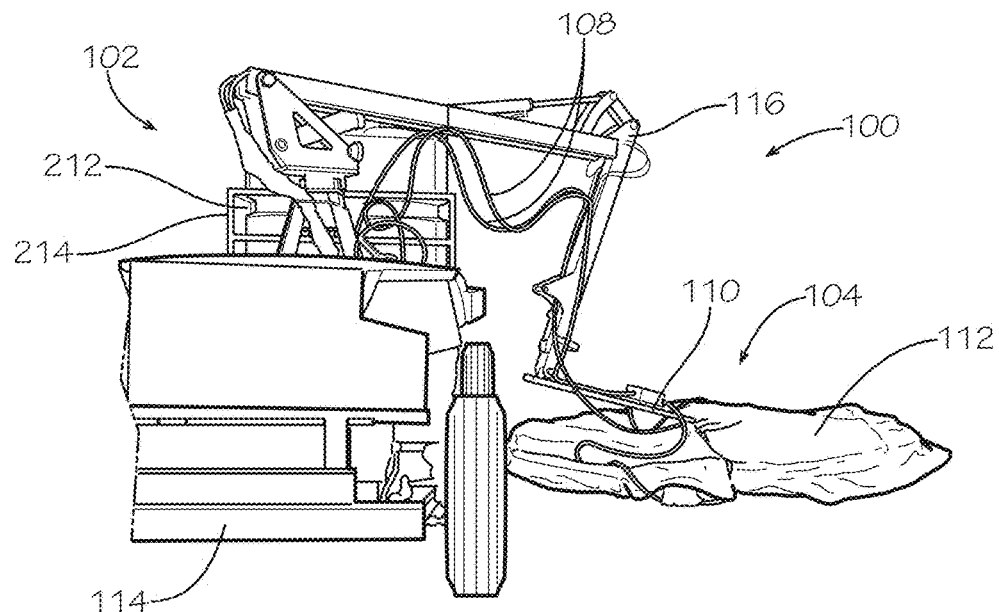
FIG. 13 illustrates a perspective view of the canopy treatment system of FIG. 1 with the canopy in a collapsed state according to aspects of the present disclosure.
Figure 14:
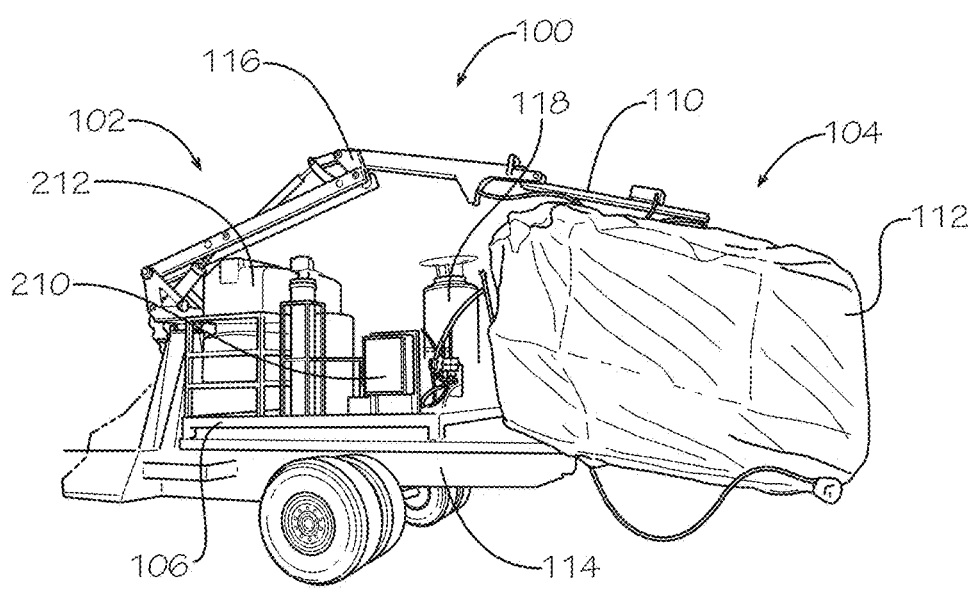
FIG. 14 illustrates a perspective view of the canopy treatment system of FIG. 1 with the canopy in a partially collapsed state according to aspects of the present disclosure.
Figure 15:
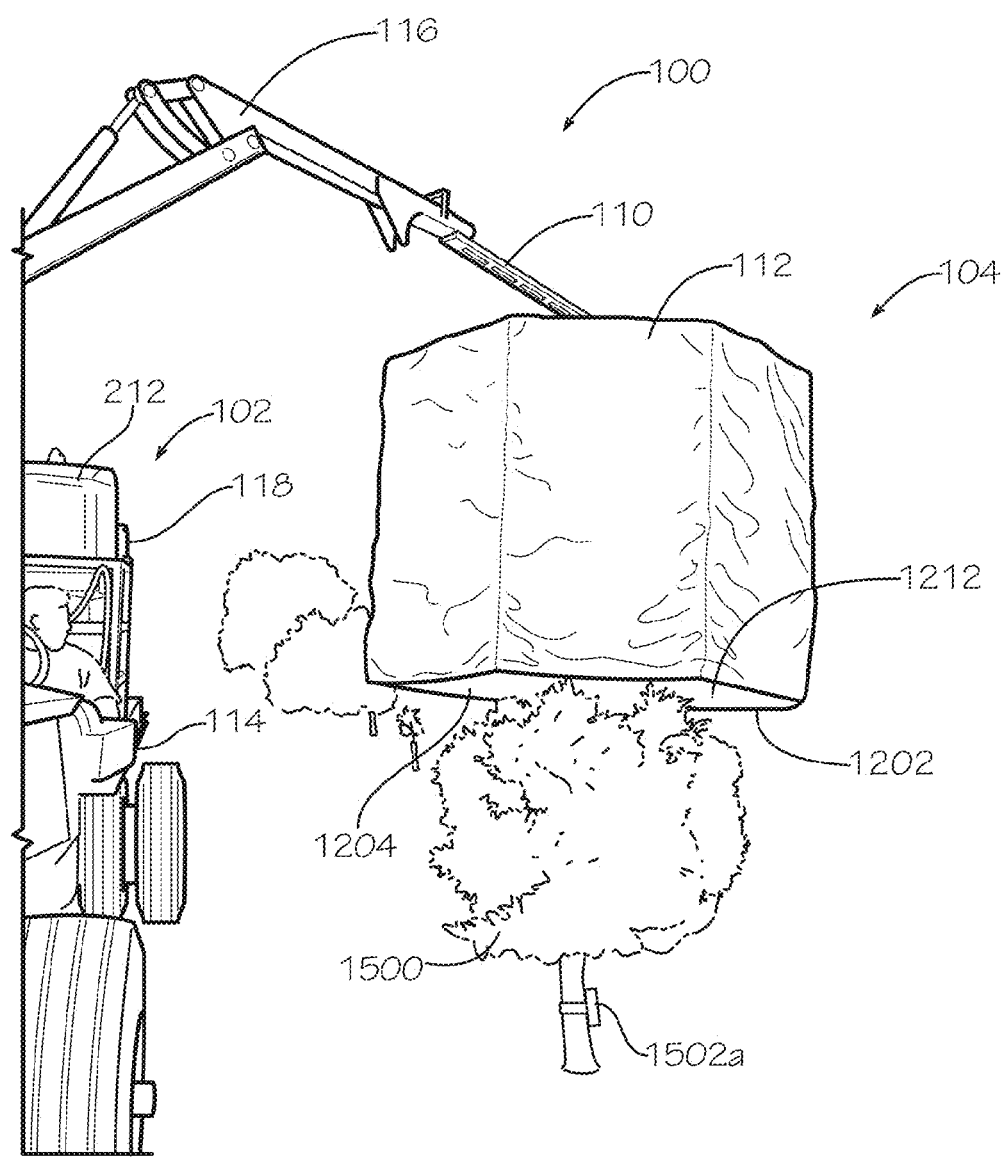
FIG. 15 illustrates a perspective view of the treatment canopy treatment system of FIG. 1 with the canopy in an extended state and being positioned around a tree according to aspects of the present disclosure.

FIG. 13 illustrates the canopy treatment system 100 with canopy 104 at the collapsed height. FIG. 14 illustrates the canopy treatment system 100 with the canopy 104 between the collapsed height and the extended height. FIG. 15 illustrates the canopy treatment system 100 with the canopy 104 at the extended height. In various embodiments, the canopy 104 is in the extended height while the elevating mechanism 116 raises and lowers the canopy 104 around the tree to be treated. The canopy 104 may be raised and lowered without having to return the canopy 104 to the collapsed height. Raising and lowering the canopy 104 in the extended height may increase the energy efficiency of the canopy treatment system 100 because the heated air may be retained within the canopy 104 even as the canopy 104 is moved between trees or plants to be treated.

FIG. 15 illustrates the canopy 104 at the extended height. As illustrated in FIG. 15, the cover 112 is draped around and surrounds the treatment rings 800. As illustrated in FIG. 15, in various embodiments, the base opening 1204 of the base ring 1202 is positioned over a tree 1500 to be treated before the canopy 104 is positioned around the tree 1500. To treat the tree 1500, the canopy 104 may be lowered over the tree 1500 such that the tree 1500 is positioned in the canopy treatment region 1212 defined by the treatment rings 800. In various embodiments, the canopy 104 is positioned around the tree 1500 with the base ring 1202 positioned on the ground. As illustrated in FIG. 15, in various embodiments, the temperature transmitter 1502a is attached to the tree 1500. In various other embodiments, the temperature transmitter 1502a may be positioned at any location on the tree 1500 or at any other location proximate to the tree 1500 such that the temperature transmitter 1502a will be within the treatment region 1212 to monitor the temperature within the treatment region 1212 when the canopy 104 is lowered over the tree 1500. In various embodiments, the temperature transmitters 1502a,b may communicate with the PLC via a wired or wireless communication system.

In examples, dual temperature transmitters 1502a,b may be implemented such that one of the temperature transmitters 1502a may be placed on a first tree while temperature transmitter 1502b is placed on a second tree. In this example, the first tree may be treated while the temperature transmitter 1502b is affixed to the second tree. Then, the second tree can be treated while the temperature transmitter 1502a is removed from the first tree and affixed to a third tree. In this way, the process of treating the trees may be expedited.

Figure 16:
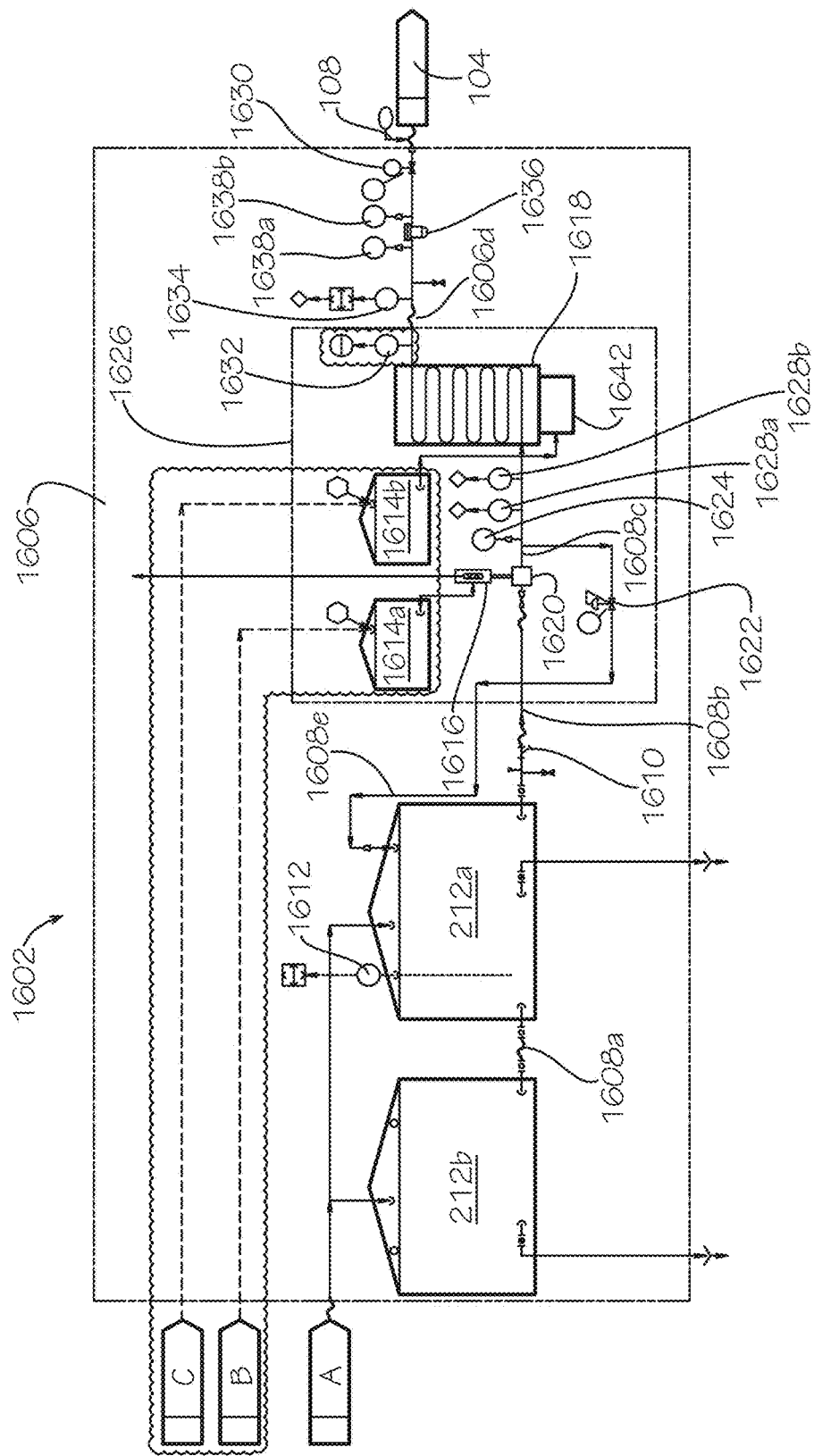
FIG. 16 is an operational schematic of another example of a hot water generating system according to aspects of the present disclosure.

FIG. 16 illustrates a schematic of a hot water generating system 1602. The hot water generating system 1602 includes a hot water generator 1618, which may be functionally similar to the hot water generators 118, 418, and a pump 1620, which may be functionally similar to the pumps 120, 420. The hot water generating system 1602 also includes an engine 1616, which may be functionally similar to the engines 316, 416, and configured to drive the pump 1620. The hot water generating system 1602 also includes a skid 1626, which may be functionally similar to the skids 302, 426, and a base 1606, which may be functionally similar to the bases 106, 406. As illustrated in FIG. 16, the hot water generating system 1602 includes the two water tanks 212a, b; however, in various other embodiments, any desired number of water tanks 212 may be utilized.

In various embodiments, each water tank 212a,b may be used for filling, recirculation, or redundancy. As illustrated in FIG. 16, the water tanks 212a,b may be connected through a hose 1608a such that a fluid level in the water tanks 212a,b will rise and fall together, and the water tanks 212a,b thereby act as a single water tank. In various embodiments, hose 1608b may connect to either or both water tanks 212a,b. In various embodiments, the water tanks 212a,b are supplied with fluid from a water source A, which may be a soft water source. The water tank 212a may include a water level transmitter 1612, which may be functionally similar to the water level transmitter 312. In various embodiments, the water tanks 212 may be omitted if, for example, the base 1606 is attached to a water supply.

As illustrated in FIG. 16, the water tanks 212a,b are connected to the pump 1620 through a hose 1608b such that water may flow between the water tanks 212a,b and the pump 1620. As illustrated in FIG. 16, in various embodiments, the supply system 1602 may optionally include a strainer 1610 between the water tanks 212a,b and the pump 1620; however, the disclosure of the strainer 1610 should not be considered limiting on the current disclosure. The pump 1620 is connected to the hot water generator 1618 through a hose 1608c. In various embodiments, a burner 1642, which may be functionally similar to the burner 1802, is utilized to provide heat into the water.

As illustrated in FIG. 16, the hot water generating system 1602 may include storage tanks 1614a,b. In various embodiments, the storage tank 1614a stores a fuel supply for the engine 1616 and the storage tank 1614b stores a fuel supply for the burner 1642.

In various embodiments where the fuel for the engine 1616 is different from the fuel for the burner 1642, the storage tank 1614a may be supplied with fuel from a fuel source B and the storage tank 1614b may be supplied from a fuel source C. However, in various other embodiments, the engine 1616 and burner 1642 may use the same fuel and a single fuel source may be utilized.

In various embodiments, the supply system 1602 includes a recirculation valve 1622, which may be functionally similar to the recirculation valve 1900. The recirculation valve 1622 may be positioned between the pump 1620 and the hot water generator 1618. In various embodiments, the recirculation valve 1622 is opened and recirculates water discharged from the pump 1620 to the water tank 212a or 212b when a canopy valve 1630 is closed. The recirculation valve 1622 is adjustable to adjust the amount of fluid flow from the pump 1620 to the water tank 212a and from the pump 1620 to the hot water generator 1618. Because the temperature of the outlet fluid from the hot water generating system 1602 depends on the amount of fluid flow through the hot water generator 1618, adjusting the recirculation valve 1622 to adjust fluid flow may change the temperature of the outlet fluid.

As illustrated in FIG. 16, in various embodiments, the supply system 1602 includes a meter 1624 between the pump 1620 and the hot water generator 1618. The meter 1624 may indicate the pressure and/or flow of fluid exiting the pump 1620. The operator may use this information to adjust the pressure and flow within the supply system 1602 by adjusting the recirculation valve 1622 to achieve a particular pressure in the pump discharge. In various embodiments, the meter 1624 and the recirculation valve 1622 may be in electrical or wireless communication with the PLC, and the PLC will control the position of the recirculation vale 1622 to maintain an operator selected setpoint of meter 1624.

The supply system 1602 may include low flow switches 1628a,b, which may be functionally similar to 1816a,b, between the pump 1620 and the hot water generator 1618 in various embodiments. The number of low flow switches 1628 should not be considered limiting on the current disclosure. The low flow switches 1628a,b may be utilized to detect the flow of water to the hot water generator 1618. In various embodiments, the low flow switches 1628a,b are in electrical communication with a burner control wiring enclosure (not illustrated), which may be similar to the burner control wiring enclosure 306. The low flow switches 1628a,b may aid in controlling when the burner 1642 turns on and off. Accordingly, the low flow switches 1628a,b may aid in reducing damage to the burner 1642 by preventing the burner 1642 from turning on when water flow below a predetermined flow rate is detected.

Heated water may exit the hot water generator 1618. Together, the pump 1620 and hot water generator 1618 pressurize the water from the tanks 212a,b and heat the water under pressure. The canopy valve 1630, which may be functionally similar to the canopy valves 1902, 432, is connected to the hot water generator 1618 through a hosing 1608d. The canopy valve 1630 regulates the flow of the heated and pressurized water from the hot water generating system 1602 to the canopy 104, and may be automatically controlled by the system controller. In various embodiments, the heated water is recirculated via the recirculation valve 1622 from the hot water generating system 1602 to the tanks 212a,b through a hosing 1608e until the canopy valve 1630 is opened.

As illustrated in FIG. 16, the hot water generating system 1602 includes a first temperature probe 1632 which may be functionally similar to the heater temperature probe 440, and a second temperature probe 1634, which may be functionally similar to temperature probe 430. In various embodiments, the first temperature probe 1632 communicates with the burner control wiring enclosure to display the temperature of the water on a temperature display. The second temperature probe 1634 may communicate with the system controller. The operator may use the information from the second temperature probe 1634 to adjustably control the temperature of the outlet water from the hot water generator 1618 and maintain a desired outlet water temperature. The second temperature probe 1634 may also communicate the temperature to the burner controller in various embodiments. In various embodiments, a single temperature probe such as the first temperature probe 1632 may communicate the temperature to both the PLC and the burner controller.

Figure 17:
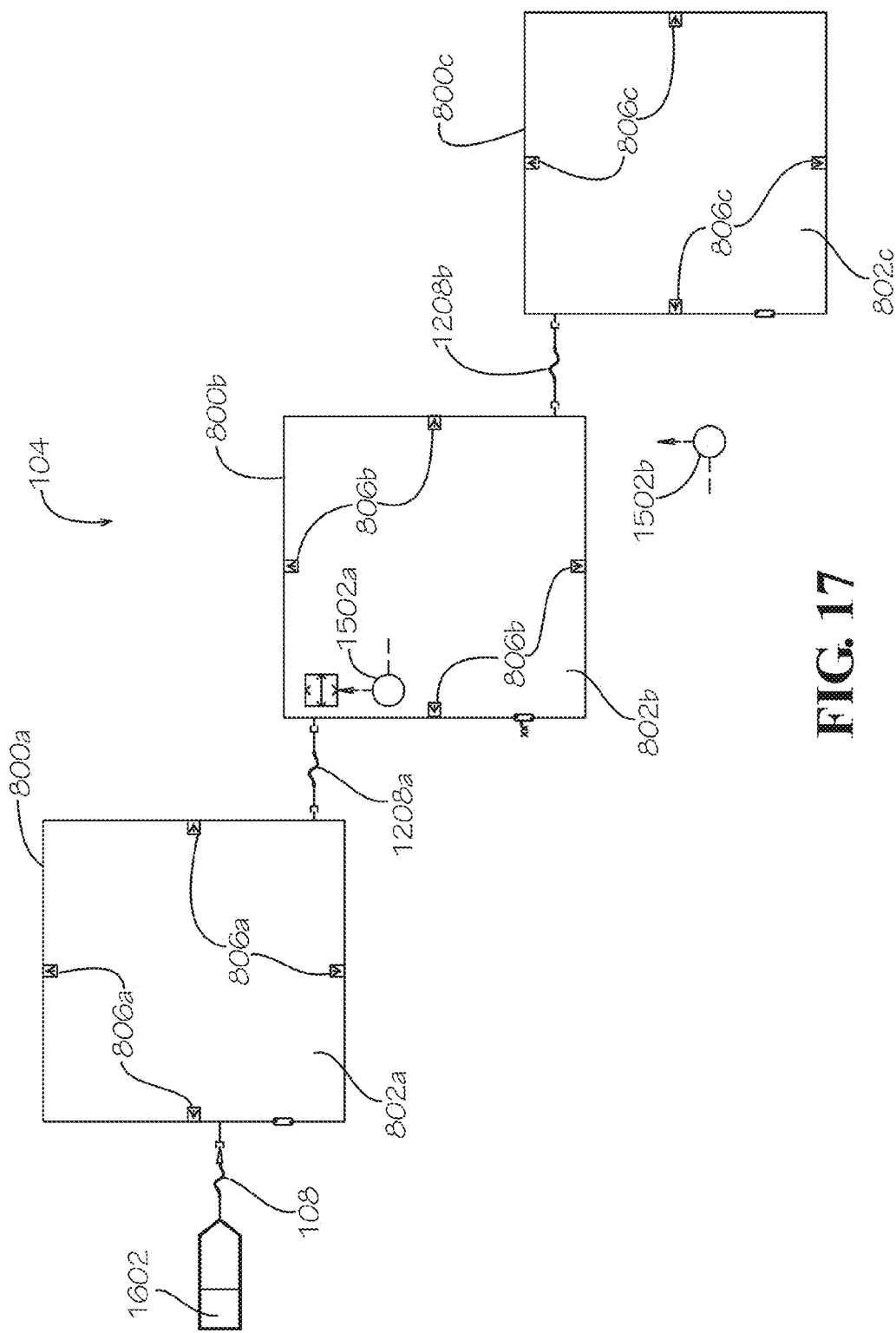
FIG. 17 is an operational schematic of the canopy of FIG. 1 according to aspects of the present disclosure.

The hot water generating system 1602 may include a strainer 1636, which may be functionally similar to the strainer 436, and inlet and outlet pressure gauges 1638a,b, which may be functionally similar to inlet and outlet pressure gauges 434a,b. As illustrated in FIG. 16, the hot water generating system 1602 may also include the flow meter 1624, which may be functionally similar to the flow meter 438. As illustrated in FIG. 16 and FIG. 17, the hot water generating system 1602 is connected to the canopy 104 through the hosing 108.

In various embodiments, the canopy valve 1630 is in communication with the system controller applying the treatment technique. In various embodiments, the operator may program the system controller by entering in a desired treatment duration time, a desired treatment temperature, and/or a desired treatment pressure from the operator. The treatment duration time may be any length of time suitable for treating the tree, plant, or item to be treated. The user may select a start button to initiate the treatment technique, which communicates with the canopy valve 1630 to permit fluid flow from the hot water generating system 1602 to the canopy 104. In various embodiments, the user selects the start button after a temperature transmitter, such as temperature transmitter 1502a, is positioned near the center of the tree 1500 and the canopy 104 is positioned over and is lowered around a tree to be treated.

The system controller accordingly uses the treatment duration time, treatment temperature, and/or treatment pressure to control the temperature and pressure of the water output by the hot water generating system 1602 and the duration of the fluid flow through the spray nozzles 806 of the canopy 104 during the treatment technique. Through the HMI 3010 of the user device 3008, the operator may visually monitor various aspects of the canopy treatment system 100. For example, the user device 3008 may allow the operator to monitor the water level within the water tank 212a as determined by the water level transmitter 1612, the on/off status of the burner 1642, various temperatures as recorded by the various temperature probes 1632, 1634, 1502a,b, the open/closed position of the canopy valve 1630, flow levels as recorded by the flow switches 1628a,b, the start/stop function of the hot water generator 1618, a treatment duration timer, a treatment cycle counter, various alarms and warnings, or various other aspects of the canopy treatment system 100.

In various embodiments, the hot water generator 1618 is controlled through the system controller to maintain a desired outlet water temperature and to maintain a desired temperature in the treatment region 1212. When the canopy valve 1630 of the hot water generating system 1602 is opened, hot water from the hot water generating system 1602 flows to the canopy 104. The treatment rings 800 spray the hot water through the spray nozzles 806. In various embodiments, the temperature transmitter 1502a transmits a temperature signal including the detected temperature within the canopy treatment region 1212 to the system controller. In various embodiments, the system controller selectively opens and closes the canopy valve 1630 to maintain a desired temperature within the treatment regions 1212 during heat treatment and closes the canopy valve 1630 when a desired treatment time at a desired temperature has been achieved. In various embodiments, the canopy valve 1630 may be modulated continuously by a PLC signal to maintain the treatment temperature within the canopy region 1212 at the operator selected temperature.

FIG. 17 illustrates a schematic of the canopy 104. Any reference below to the hot water generating system 1602 is equally applicable to the hot water generating system 102 or the hot water generating system 402. When the canopy valve 1630 is opened, hot water from the hot water generating system 1602 flows through the hosing 108 to the canopy 104. In various embodiments, the canopy 104 is lowered around the tree 1500 (illustrated in FIG. 15) to be treated until the base ring 1202 rests on the ground surface. The canopy 104 sprays the hot water through spray nozzle 806 of the treatment ring 800. The number and orientation of spray nozzles 806 and treatment rings 800 shall not be limiting on the current disclosure.

As illustrated in FIG. 17, the temperature transmitter 1502a may be positioned at a location that will be within the canopy 104 in the treatment region 1212, which is defined by the aligned treatment regions 802a,b,c. In various other embodiments, the temperature transmitter 1502b may be positioned at the location that will be within the canopy 104. While the tree is being treated, the user may place the second temperature transmitter 1502b at the next tree to be treated (not illustrated). The number of temperature transmitters 1502 should not be considered limiting on the current disclosure. In various embodiments, after the heat treatment of the tree is finished, the canopy 104 is raised and the canopy treatment system 100 is relocated to the next tree where the process starts again.

In various embodiments, the temperature transmitters 1502 transmit a temperature signal to the system controller to communicate the detected temperature. The canopy treatment region 1212 may be heated to a temperature that is sufficient to reduce and/or prevent disease infection in a plant. For example, in various embodiments, the temperature may be at a temperature between 121° F. and 135° F., such as within the canopy temperature setpoint range, the canopy high temperature limit range, or the canopy high-high temperature limit range. In various embodiments, the spray continues until a desired treatment temperature is maintained at an adjustable temperature level for an adjustable time period.

FIG. 18 illustrates an electrical schematic of the burner control wiring enclosure 306 for the canopy treatment system 100. In various embodiments, the burner control wiring enclosure 306 is in electrical communication with a temperature probe 1818, which may be functionally similar to the heater temperature probe 440. The burner control wiring enclosure 306 displays the temperature detected by the temperature probe 1818 on the visual temperature display 1806. The burner control wiring enclosure 306 also includes the hour meter 1804 in various embodiments, which counts the amount of time that the engine 316 has been in operation. The burner controller may communicate with the system controller through the start/stop relay 1808 such that the temperature of the burner 1802 may be controlled to get a desired water temperature output from the hot water generator 118.

In various embodiments, when the treatment technique is initiated, the system controller opens the canopy valve 1902 (illustrated in FIG. 19) to permit fluid flow from the hot water generating system 102 to the nozzles 806 of the canopy 104. The flowing water may activate flow switches 1816a,b, which may be functionally similar to the flow switches 1628*a,b*, and thereby enable the burner 1802 to fire up and to heat the water in the hot water generator 118. In various embodiments, the burner on/off switch 1810 is turned "on" before the burner 1802 is enabled to fire. In various embodiments, if flow, as measured by the low flow switches 1816*a,b*, is lost or below a predetermined low flow threshold, the burner 1802 will shut off. A circuit breaker 1812 may also be used to disrupt the circuit in various embodiments. In various embodiments, after water heats the canopy 104 to a desired temperature level and a treatment duration time has expired, the canopy valve 1902 will shut and the burner 1802 will cease firing due to the loss of flow across the flow switches 1816*a,b*. The water flow will then recirculate to the tank 212 via the recirculation valve 1900.

In various embodiments, the conditions that may be satisfied for the burner to operate include the system controller being turned on and optionally in communication with the user device 3008, the engine 316 being running, which in turn operates the pump 120, an "on" switch being turned on, a minimum water flow through hot water generator 118 as verified through low flow switches 1816*a,b* and the water level in the tank 212 being above the predetermined water level. In various embodiments, if water levels in the tank 212 are too low, a low level trip of the water level transmitter 312 is activated, which may prevent the engine 316 from operating until the water tanks are refilled.

Figure 19:
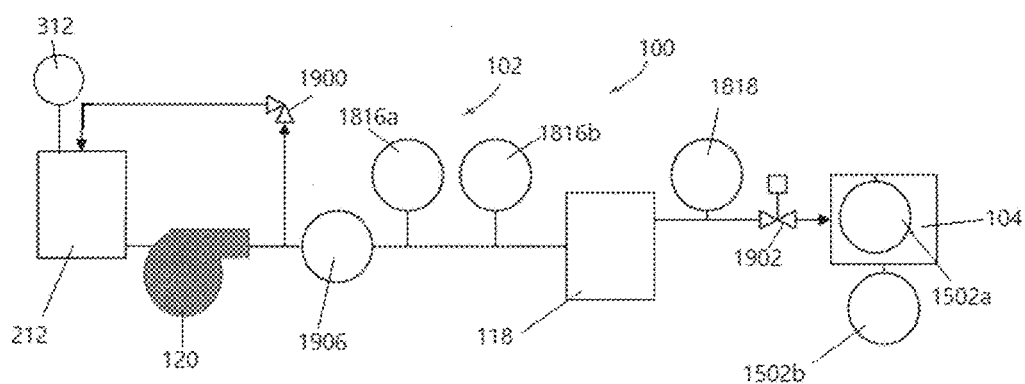
FIG. 19 is a diagram showing the flow path of water through the canopy treatment system of FIG. 1 according to aspects of the present disclosure.

FIG. 19 illustrates a diagram of the flow path of water through the canopy treatment system 100. Water may be held in a water tank 212. The pump 120 pumps water from the water tank 212 to the hot water generator 118. As illustrated in FIG. 19, in various embodiments, the water may flow through a flow meter 1906, which may be functionally similar to the flow meter 438, 1624, and past the low flow switches 1816*a,b* to the hot water generator 118. The water is heated in the hot water generator 118 and exits the hot water generator 118 to flow past the temperature probe 1818 and to the canopy valve 1902. When the canopy valve 1902 is open, the hot water flows to the canopy 104 to treat the tree. One of the temperature transmitters 1502*a,b* is positioned within the canopy 104 to monitor the temperature of the atmosphere created by the hot water in the canopy 104. In various embodiments, when the canopy valve 1902 is closed, water exiting the pump 120 is recirculated to the water tank 212 via the recirculation valve 1900.

Figure 20:
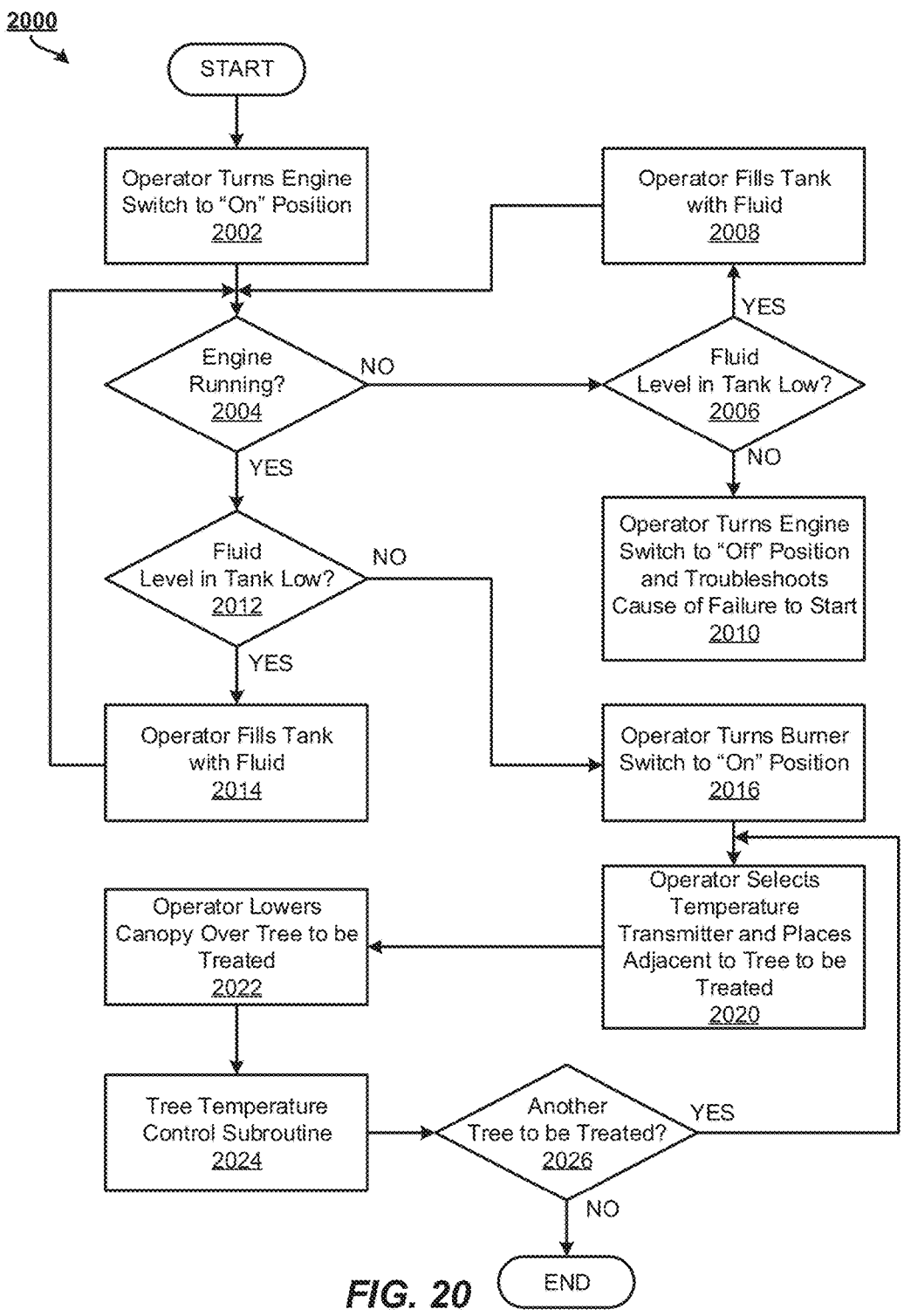
FIG. 20 is a flow chart of a main routine of treating a tree with the canopy treatment system of FIG. 1 according to aspects of the present disclosure.

FIG. 20 is a flow chart of an embodiment of a main routine 2000 for treating a tree with the canopy treatment system 100 having the hot water generating system 102 and the canopy 104. Reference below to the hot water generating system 102 is also applicable to the hot water generating systems 402, 1602. It should be noted that any of the steps of any of the methods described herein may be performed in any suitable order or could be performed in sub-steps that are done in any suitable order or that are separated in time from each other by other steps or sub-steps, and the disclosure of a particular order of steps should not be considered limiting on the current disclosure.

As illustrated in FIG. 20, after starting the routine, the operator turns an engine switch of the engine 316 to an "on" position in step 2002. In step 2004, the operator determines whether the engine 316 is running. If the engine 316 is not running, in step 2006, the operator determines whether the water level in the water tank 212 is at or below a predetermined level. In various embodiments, the operator is notified of the low water level through a low level alert that is displayed on the user device 3008 when the water level transmitter 312 detects that the water level in the tank 212 is below the predetermined level. If the water level is low, in step 2008, the operator fills the water tank 212 with water and returns to step 2004. If the engine is not running and the water tank level is not low, in step 2010, the operator turns the engine switch to an "off" position and the operator troubleshoots the cause of the failure of the engine 316 to start.

In step 2012, if the engine 316 is running, the operator determines if the water level in the water tank 212 is low. If the water level in the water tank 212 is low, in step 2014, the operator fills the water tank 212 with water and returns to step 2004. If the water level in the water tank 212 is not low, in step 2016, the operator turns the burner switch 1810 to an "on" position.

In step 2020, the operator selects one of the temperature transmitters 1502 and places it within the canopy of the tree to be treated. After the operator places one of the temperature transmitters 1502 adjacent to the tree, in step 2022, the operator lowers the canopy 104 over the tree to be treated such that the tree is positioned within the canopy treatment region 1212. In step 2024, tree temperature control sub-routine takes place. In step 2026, the operator determines whether another tree is to be treated with heat treatment. If another tree is to be treated, the main routine 2000 returns to step 2020. If there is not another tree to be treated, the main routine 2000 ends.

Figure 21:
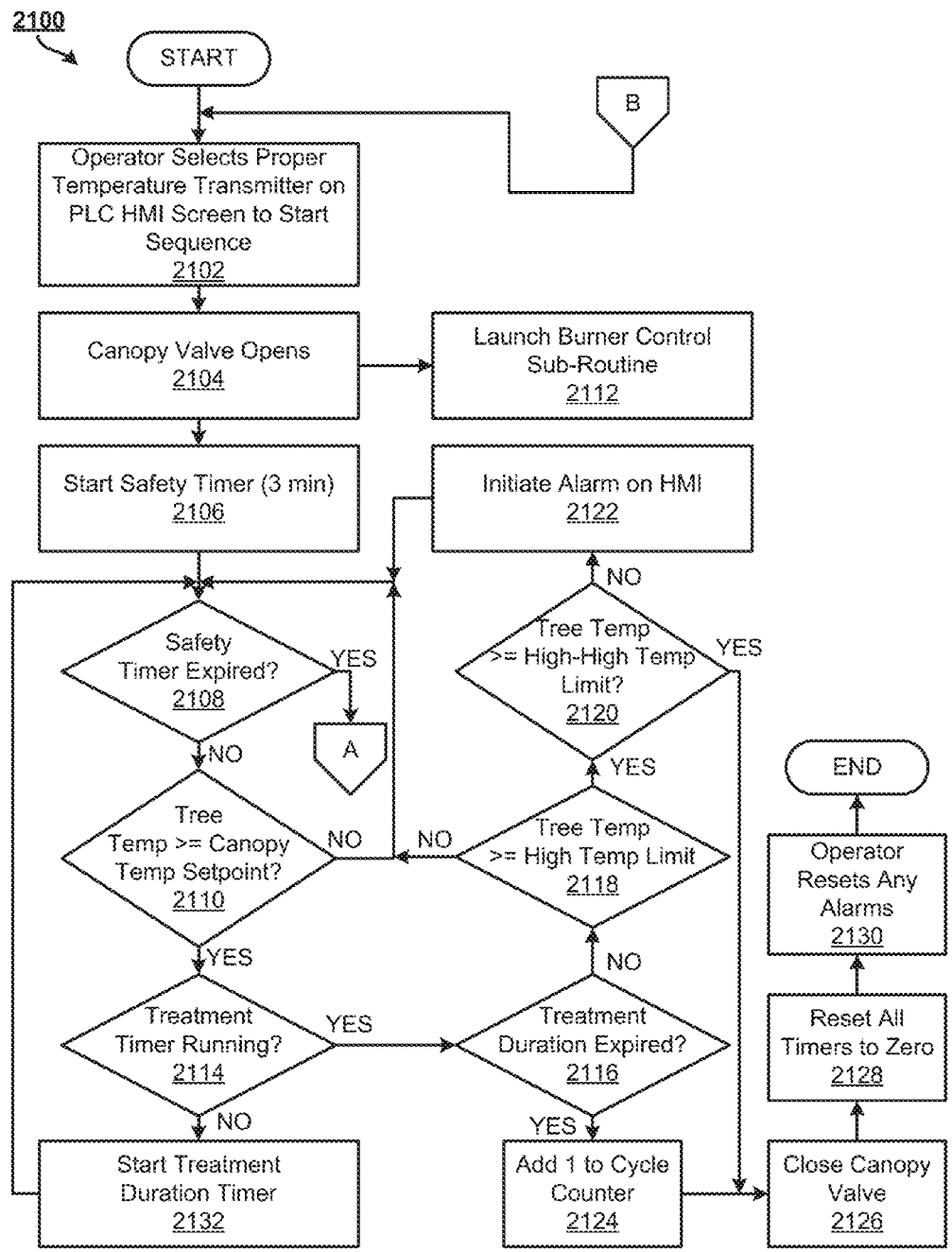
FIG. 21 is a flow chart of a sub-routine of the main routine of FIG. 20 for controlling tree temperature according to aspects of the present disclosure.
Figure 21:
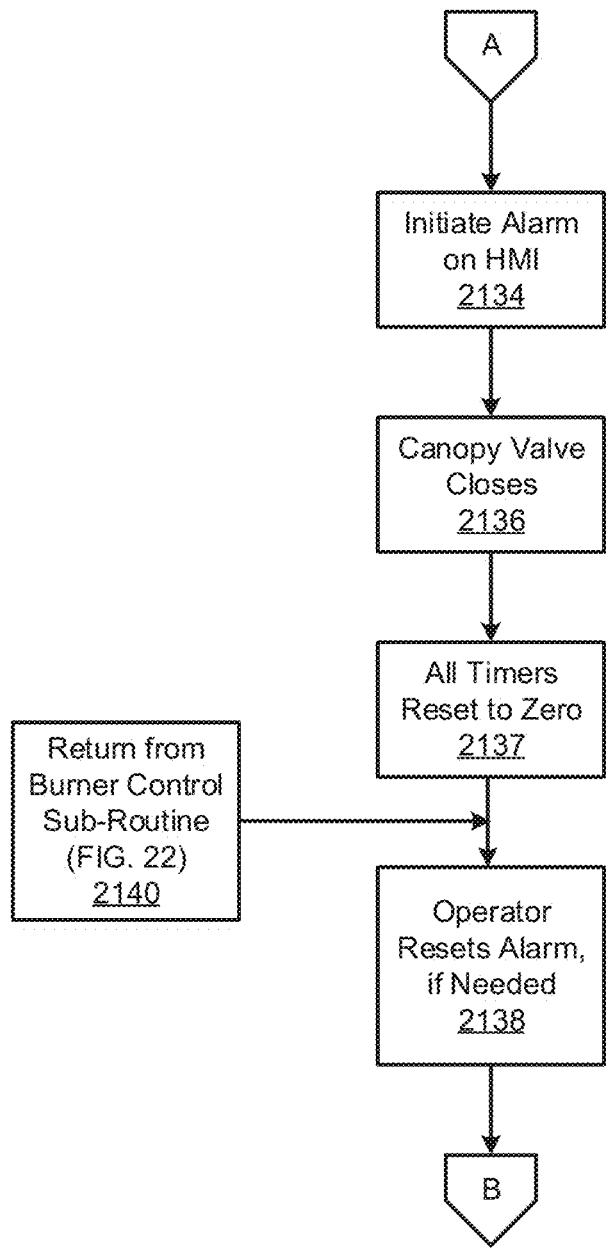

FIG. 21 illustrates a flow chart of the tree temperature control sub-routine 2100 according to various embodiments. As illustrated in FIG. 21, in step 2102, the operator selects a temperature transmitter icon 3240*a,b* (illustrated in FIG. 32), on the HMI 3010 of the user device 3008. The temperature transmitter icon 3240 selected on the HMI 3010 corresponds with the temperature transmitter 1502 selected by the operator in step 2020. In various embodiments, the icons 3240 may have any color such as red, green, blue, yellow, or any other desired color or indicia. In various embodiments, the temperature transmitter icon 3240*a* corresponding with the temperature transmitter 1502*a* may be a different color or indicia from the temperature transmitter icon 3240*b* corresponding with the temperature transmitter 1502*b*. In step 2104, the system controller opens the canopy valve 1902. In step 2112, the burner control sub-routine (illustrated in FIG. 22) is launched. In step 2106, the system controller starts a safety timer. In various embodiments, the safety timer is 3 minutes; however, in various embodiments, the safety timer may be any suitable maximum treatment duration time under any condition that would prevent exposure of the tree to heat for an extended amount of time sufficient to cause damage to the tree.

In step 2108, the system controller determines whether the safety timer has expired. If the safety timer has expired, the routine proceeds to step 2134, where the system controller initiates an alarm on the HMI 3010. Then, in step 2136, the canopy valve 1902 closes, and in step 2137, all timers are reset to zero. In step 2138, the operator resets the alarm (if needed) after the canopy closes in step 2136 and the timers are reset to zero in step 2137.

If the safety timer has not expired at step 2108, the routine 2024 proceeds to step 2110, where the system controller receives a tree temperature, which is the temperature within the treatment region 1212 as measured by the temperature transmitter 1502 within the treatment region 1212, and determines whether the tree temperature is at or above the canopy temperature setpoint. As previously described, in various embodiments, the canopy temperature setpoint may be a temperature range, such as between 121° F. and 131° F. In examples, the canopy temperature setpoint may be a particular temperature, such as about 126° F. If the tree temperature is not at or above the canopy setpoint temperature, the routine 2024 returns to step 2108. If the tree temperature is at or above the canopy temperature setpoint, the routine 2024 proceeds to step 2114, where the system controller determines whether the treatment duration timer is running. The treatment duration time may be programmed by the operator on the user device 3008.

If the treatment duration timer is not running, the routine 2024 proceeds to step 2132, where the system controller starts the timer, and then returns to step 2108. If the treatment duration timer is running, the routine 2024 proceeds to step 2116, where the system controller determines whether the treatment duration timer has expired. If the treatment duration timer has expired, the routine 2024 proceeds to step 2124. If the treatment duration timer has not expired, the routine 2024 proceeds to step 2118, where the system controller determines whether the tree temperature is at or above the canopy high temperature limit. As previously described, in various embodiments, the canopy high temperature limit may be a temperature within a range between 124° F. and 134° F. In examples, the canopy high temperature limit may be about 129° F. If the tree temperature is not above the canopy high temperature limit, the routine 2024 returns to step 2108. If the tree temperature is above the canopy high temperature limit, the routine 2024 proceeds to step 2120.

In step 2120, the system controller determines whether the tree temperature is at or above the canopy high-high temperature limit. As previously described, in various embodiments, the canopy high-high temperature limit may be a temperature within a range between 125° F. and 135° F. In examples, the canopy high-high temperature limit may be about 130° F. If the tree temperature is not at or above the canopy high-high temperature limit, in step 2122 the system controller initiates an alarm with a temperature warning on the HMI 3010 of the user device 3008, and then returns to step 2108. If the tree temperature is at or above the high-high temperature limit, the routine 2024 proceeds to step 2126, where the system controller closes the canopy valve 1902. In various embodiments, the system controller may initiate an alarm on the HMI 3010 if the canopy valve 1902 has been closed before the treatment duration timer has run out.

In step 2124, the system controller adds a count of one to a cycle counter. In various embodiments, the cycle counter may be visible to the operator on the HMI 3010, as described in greater detail below. After the system controller closes the canopy valve 1902 in step 2126, in step 2128, the system controller resets all timers to zero. In step 2130 the operator resets any alarms, and then the routine 2024 ends. After the routine ends 2024, the system controller returns to the main routine 2000.

Figure 22:
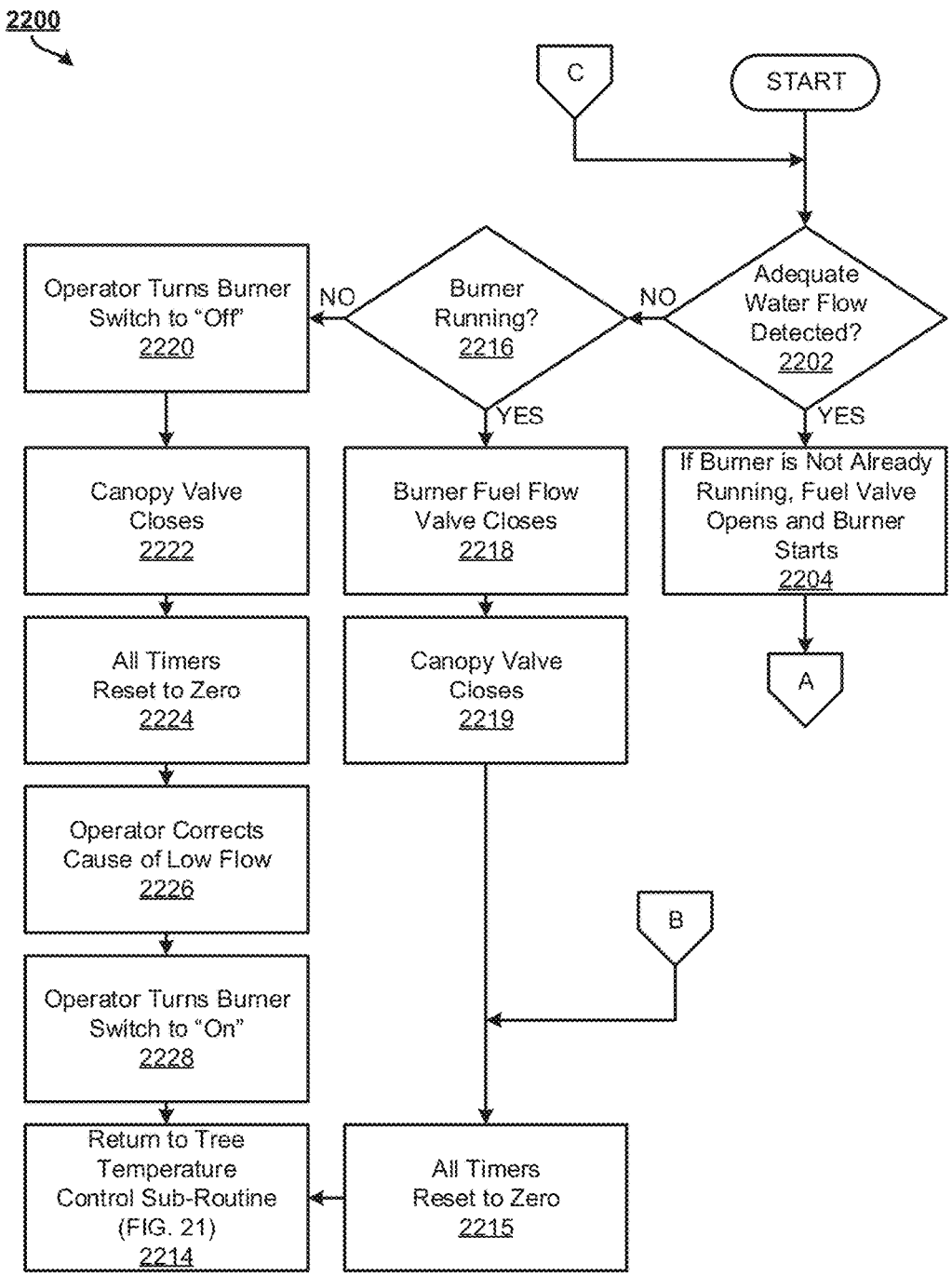
FIG. 22 is a flow chart of a sub-routine of the main routine of FIG. 20 for controlling a fluid temperature according to aspects of the present disclosure.
Figure 22:
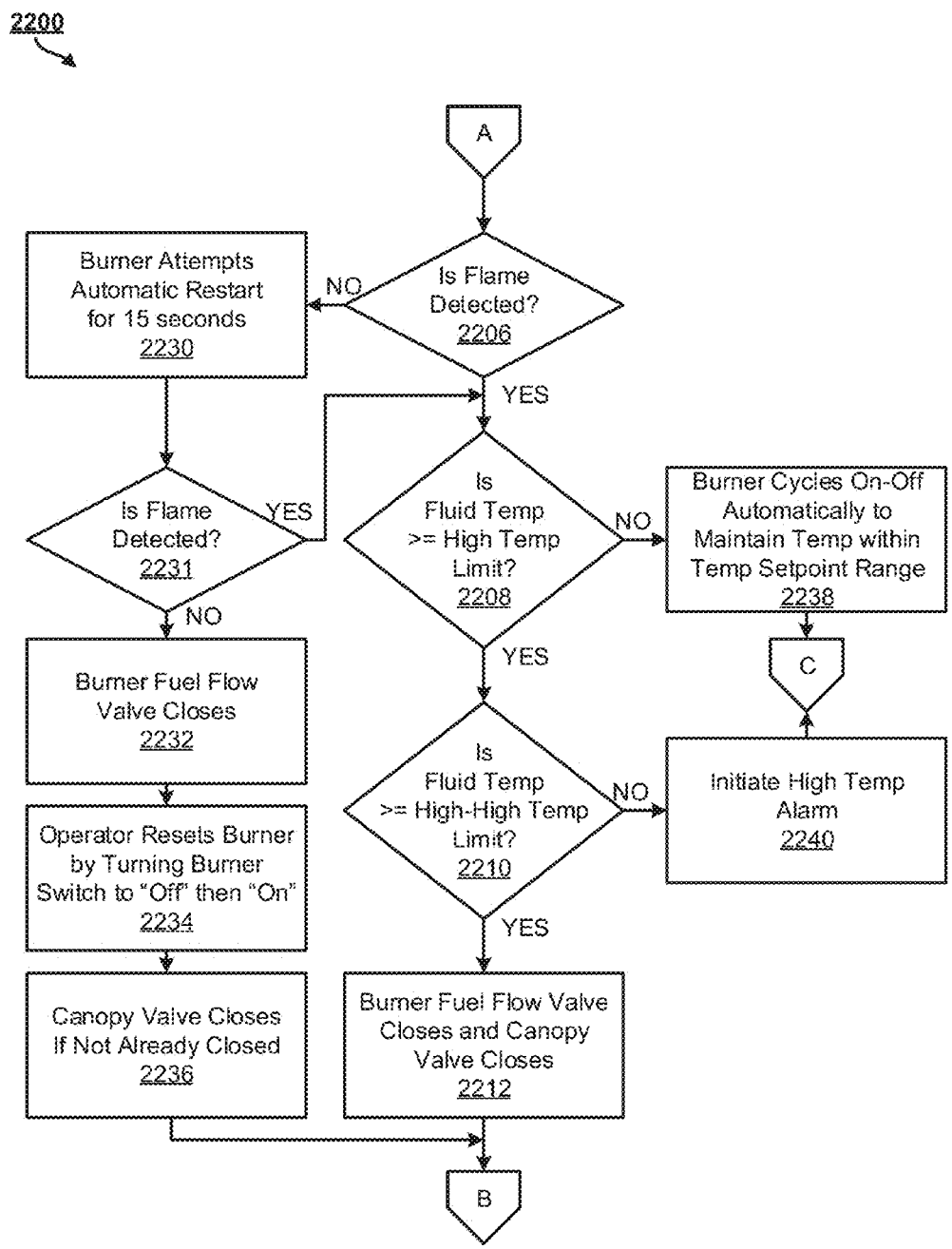

FIG. 22 illustrates a flow chart of a burner control sub-routine 2200 that was launched in step 2112 of the tree temperature control sub-routine 2024 according to various embodiments. As illustrated in in step 2202, the system controller determines whether water flow as detected by the low flow switches 1816 is adequate (i.e., at or below a predetermined fluid flow rate). If the water flow is below the predetermined fluid flow rate, in step 2216, the system controller determines if the burner 1802 is running. If the burner 1802 is not running, in step 2220, the operator turns burner switch 1810 to an "off" position, and in step 2222, the system controller closes the canopy valve. In step 2224, all timers are reset to zero, and then at step 2226, the operator corrects the cause of the low flow. At step 2228, the operator turns the burner switch to an "on" position, and then at step 2214, the burner control sub-routine 2200 returns to the tree temperature control sub-routine 2040.

If sufficient water flow is detected in step 2202, in step 2204, the system controller opens the burner fuel valve and the burner is started, if the burner is not already running.

In step 2206, the system controller determines whether a flame is detected in the burner 1802. If a flame is not detected, in step 2230, the system controller attempts to automatically restart the burner 1802 for 15 seconds or some other suitable duration while checking if a flame is detected. If the system controller does not detect a flame after the 15 seconds or other suitable duration (step 2231), in step 2232, the system controller closes the burner fuel flow valve. In step 2234, the operator resets the burner 1802 by turning the burner switch 1810 to an "off" position and then the "on" position. In step 2236, the system controller closes the canopy valve, if it is not already closed, and in step 2215, all timers are reset to zero. The system controller returns to tree temperature control sub-routine in step 2214.

If a flame is detected in step 2206, in step 2208, the system controller determines whether the fluid temperature detected by the temperature probe 1818 is at or above a water high temperature limit. In various embodiments, the water high temperature limit may be a temperature between 265° F. and 285° F., such as about 275° F.

If the water temperature is not at or above the water high temperature limit, in step 2238, the system controller enables the burner to cycle on-off automatically to maintain the treatment temperature within the setpoint range, and the routine 2200 returns to step 2202. If the water temperature is at or above the high temperature limit in step 2208, the system controller determines whether the water temperature is at or above a water high-high temperature limit. In various embodiments, the water high-high temperature limit may be a temperature between 290° F. and 310° F., such as about 300° F. If the water temperature is not at or above the water high-high temperature limit, in step 2240, the system controller initiates the high temperature alarm and the routine 2200 returns to step 2202. If the water temperature is at or above the water high-high temperature limit, in step 2212 the system controller closes the burner fuel flow valve and the canopy valve 1902 if the canopy valve 1902 is not already closed. The timers are reset to zero in step 2215, and in step 2214, the system controller returns to tree temperature control sub-routine in step 2140. After being launched in step 2112 of the tree temperature control sub-routine 2100, the burner control sub-routine 2200 may execute simultaneously or currently with the main routine 2000 and the tree temperature control sub-routine 2024 until the main routine 2000 ends. In other examples, the routines may execute in various orders, as appropriate.

Figure 23:
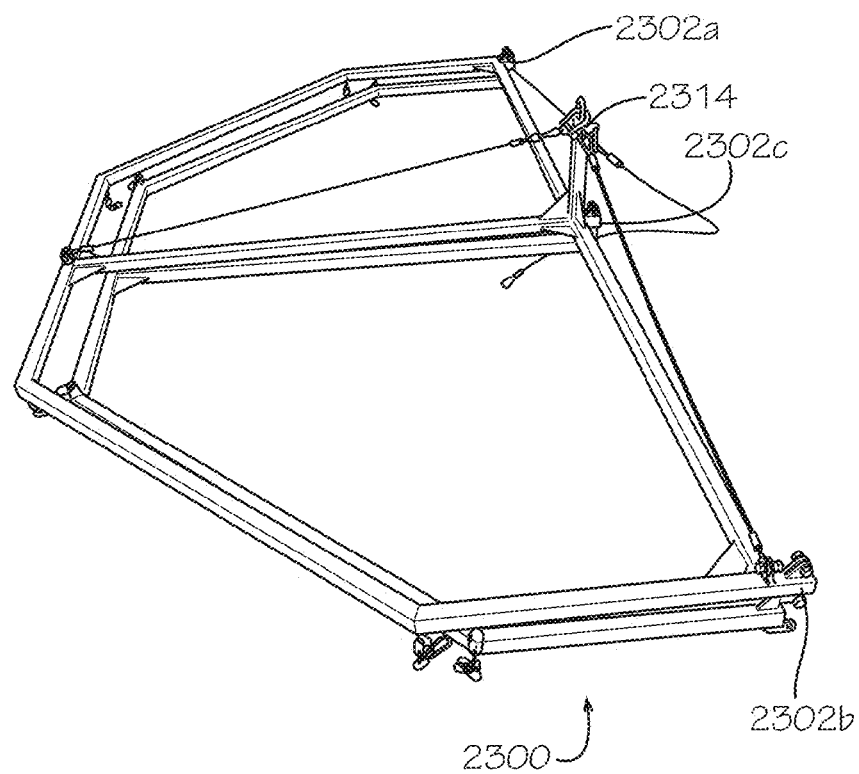
FIG. 23 illustrates a perspective view of another example of a support ring of the canopy of FIG. 1 that is folded.
Figure 24:
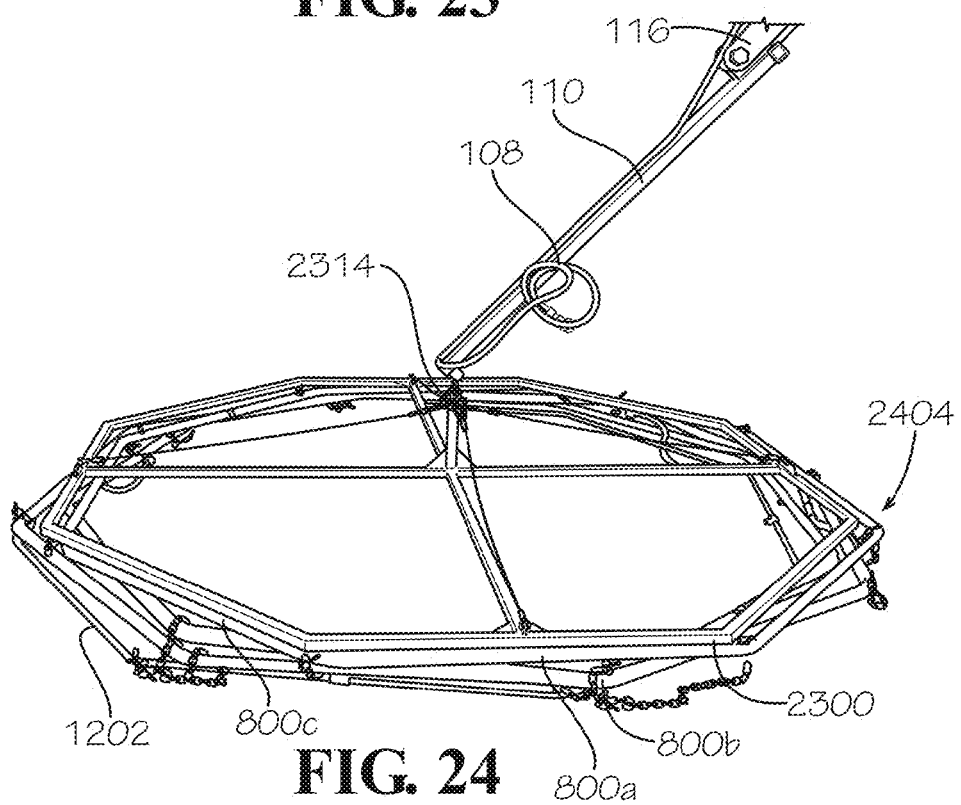
FIG. 24 illustrates a perspective view of another example of a canopy in a collapsed state and with the support ring of FIG. 23 according to aspects of the present disclosure.

FIG. 23 illustrates another embodiment of a support ring 2300. As illustrated in FIG. 23, in various embodiments, the support ring 2300 is similar to the support ring 1200, but includes hinges 2302*a,b,c* such that the support ring 2300 is foldable. Folding of the support ring 2300 via the hinges 2302*a,b,c* may make it easier for an operator to transport the support ring 2300. In various embodiments, the treatment rings 800 and the base ring 1202 may also include hinges similar to the hinges 2302*a,b* such that the treatment rings 800 and base ring 1202 are foldable. In other embodiments, treatment rings 800*a,b,c* and base ring 1202 may have other mechanical devices similar to unions 812*a,b,c* that can be separated to facilitate folding. As illustrated in FIG. 23, the support ring 2300 also includes a support connector 2314, which may be functionally similar to the support connector 1214. FIG. 24 illustrates another embodiment of a canopy 2404 with the support ring 2300 connected to the treatment rings 800a,b,c and the base ring 1202. FIG. 24 also illustrates the canopy 2404 in the collapsed height.

Figure 25:
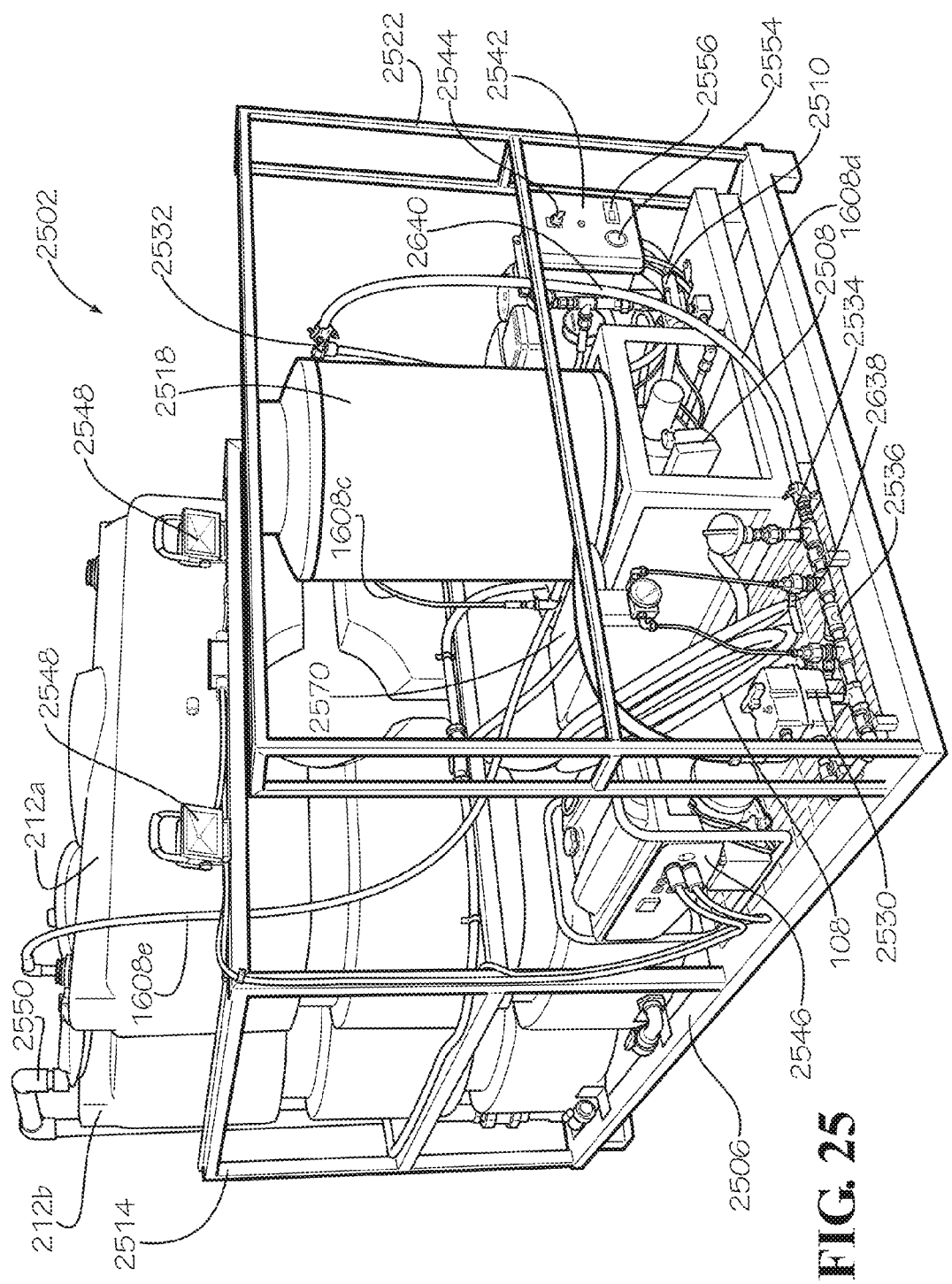
FIG. 25 illustrates a perspective view of another example of a hot water generating system according to aspects of the present disclosure.
Figure 26:
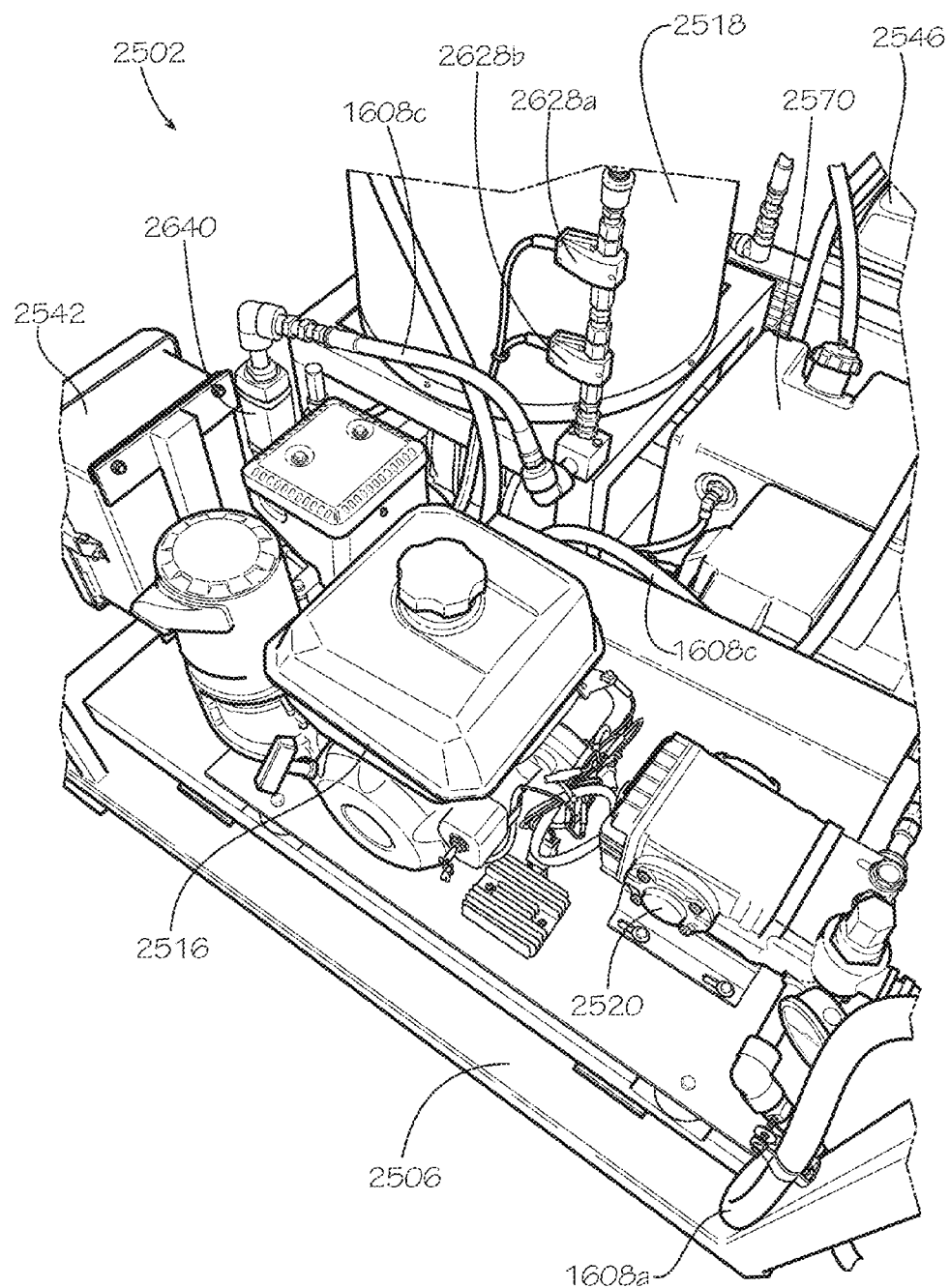
FIG. 26 illustrates another perspective view of the hot water generating system of FIG. 25 according to aspects of the present disclosure.
Figure 27:
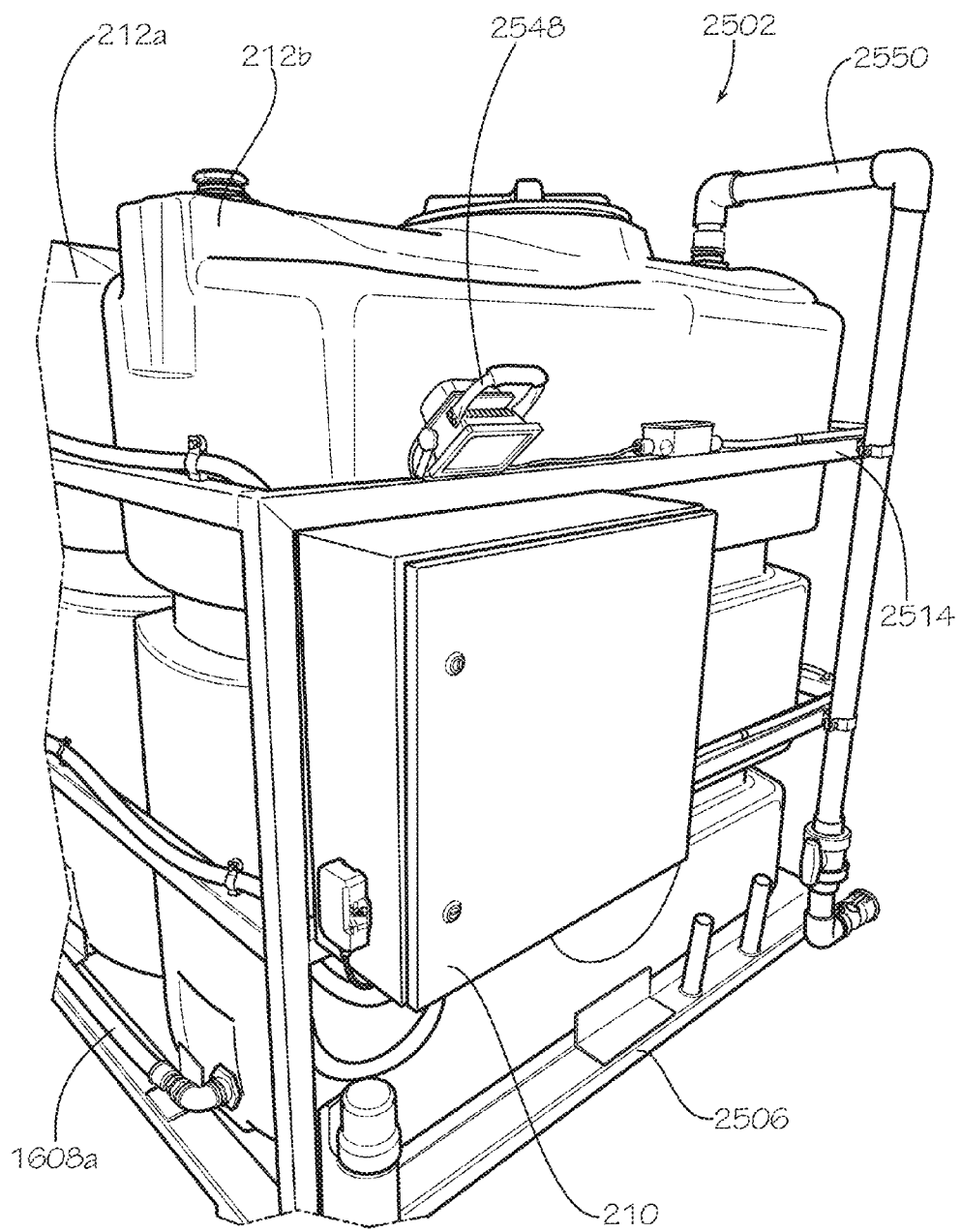
FIG. 27 illustrates another perspective view of the hot water generating system of FIG. 25 according to aspects of the present disclosure.
Figure 28:
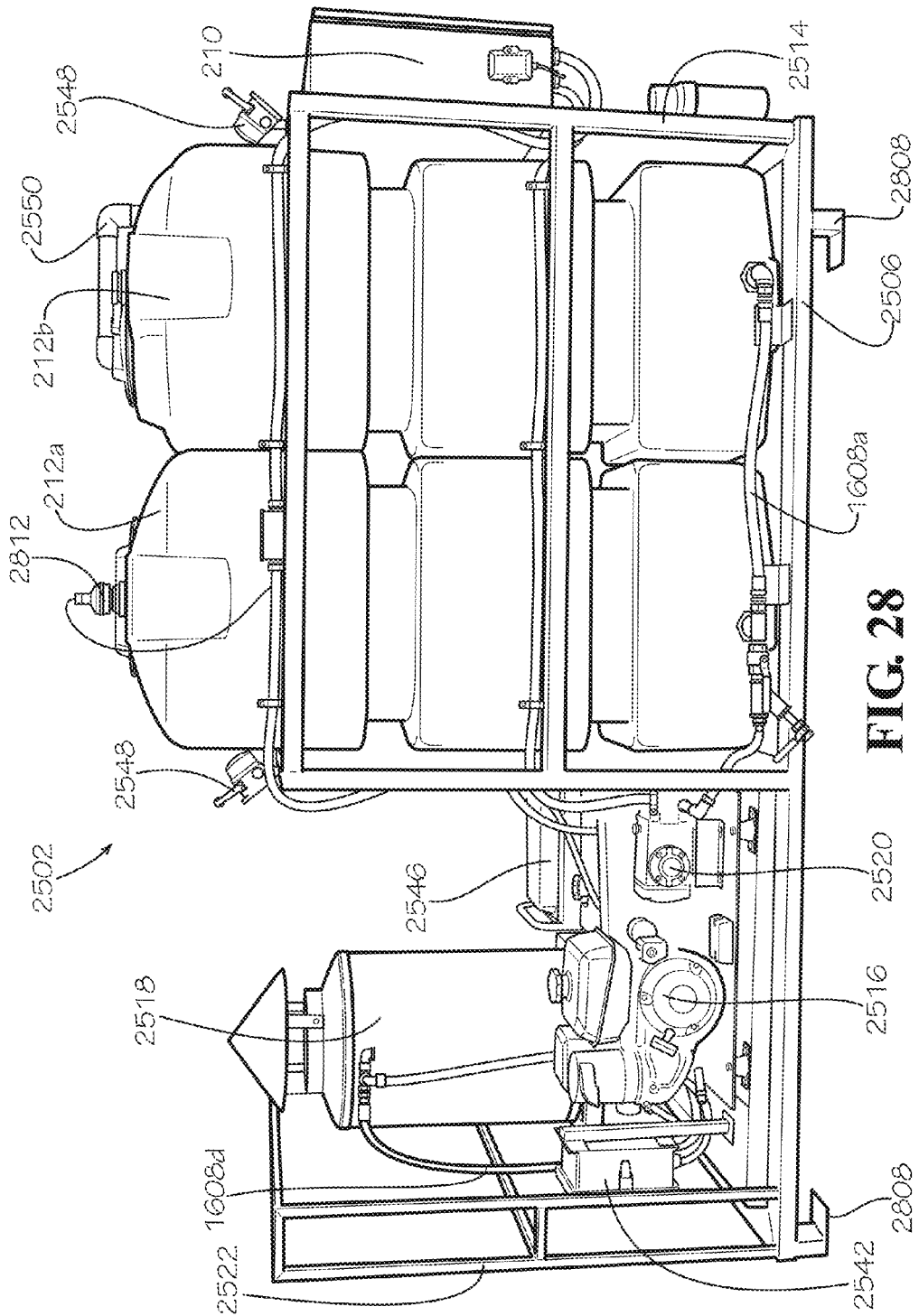
FIG. 28 illustrates another perspective view of the hot water generating system of FIG. 25 according to aspects of the present disclosure.
Figure 29:
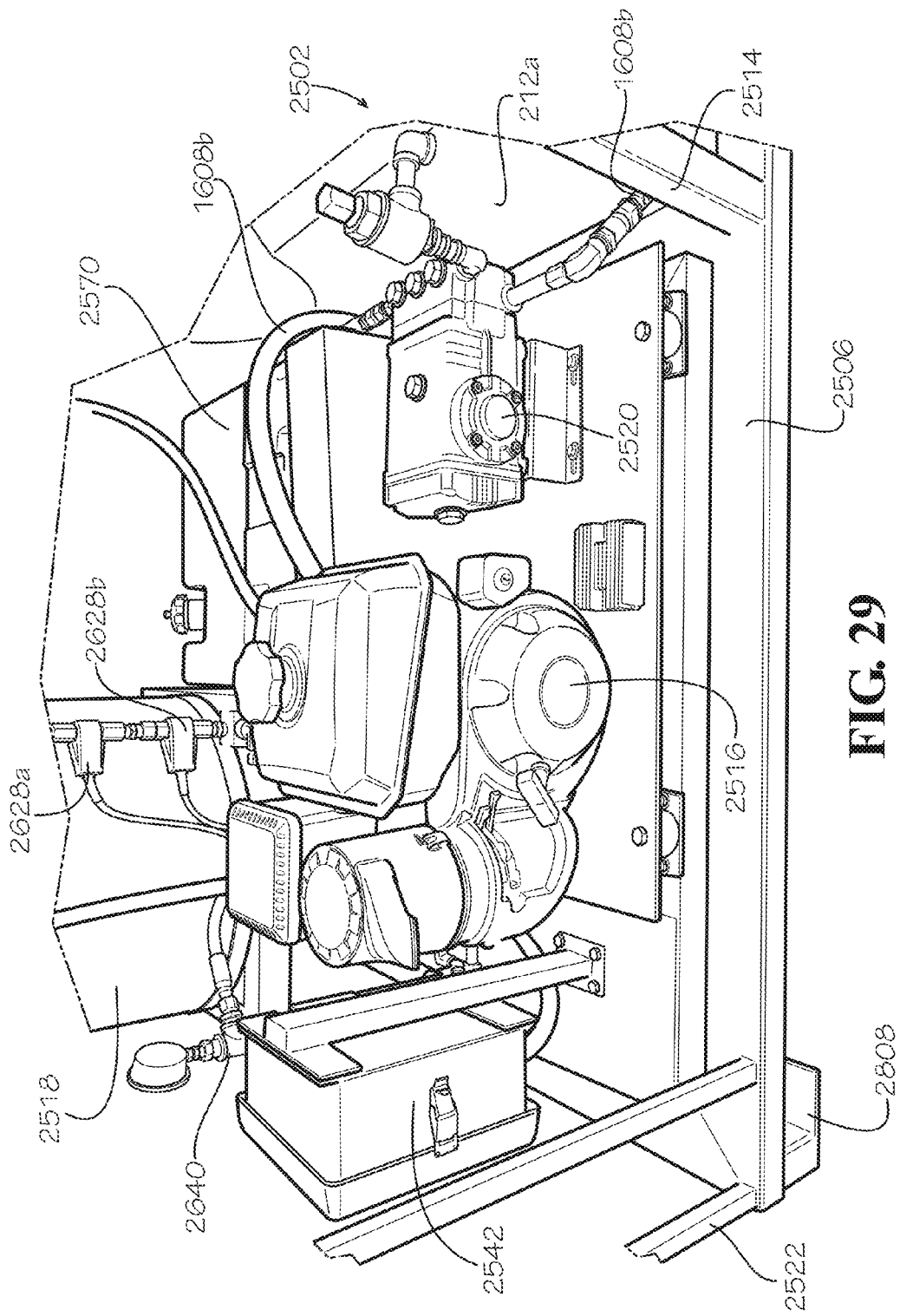
FIG. 29 illustrates another perspective view of the hot water generating system of FIG. 25 according to aspects of the present disclosure.

FIGS. 25-29 show an embodiment of a hot water generating system 2502. The hot water generating system 2502 includes a hot water generator 2518, which may be functionally similar to the hot water generators 118, 418, 1618, water tanks 212a,b, and a pump 2520, which may be functionally similar to the pumps 120, 420, 1620. The hot water generator 2518, water tanks 212a,b, and pump 2520 are positioned on a base 2506, which may be functionally similar to the bases 106, 406, 1606. As illustrated in FIG. 28, in various embodiments, the base 2506 includes feet 2808, which may be functionally similar to the feet 508. As illustrated in FIG. 25, the base 2506 includes a tank railing 2514, which may functionally similar to 214, 414, and a generator railing 2522, which may be functionally similar to 422. The hot water generating system 2502 may also include an engine 2516 (illustrated in FIG. 26), which may be functionally similar to the engines 316, 416, 1616, a burner 2508, which may be functionally similar to the burners 1642, 1802, and the storage tank 2570, which may be functionally similar to the storage tanks 1614.

As illustrated in FIGS. 25-29, the hot water generating system 2502 includes a recirculation valve 2510, which may be functionally similar to the recirculation valves 1622, 1900, low flow switches 2628a,b (illustrated in FIG. 26), which may be functionally similar to the low flow switches 1628a,b and 1816a,b, a water level transmitter 2812 (illustrated in FIG. 28), which may be functionally similar to the water level transmitter 312, 1612, a canopy valve 2530, which may be functionally similar to the canopy valve 432, 1630, 1902, a first temperature probe 2532, which may be functionally similar to the first temperature probe 440, 1632, a second temperature probe 2534, which may be functionally similar to the second temperature probe 430, 1634, 1818, a strainer 2536, which may be functionally similar to the strainer 436, 1636, a flow meter 2640 (illustrated in FIG. 26), which may be functionally similar to the flow meter 1624, 1906, a differential pressure gauge 2638, which may be functionally similar to the differential pressure gauge 434, 1638, a burner control wiring enclosure 2542, which may be functionally similar to the burner control wiring enclosure 306, 428, and the controller enclosure 210 (illustrated in FIG. 27), which may be functionally similar to 410. As illustrated in FIG. 25, the burner control wiring enclosure 2542 includes a burner switch 2544, which may be functionally similar to 1810, an hour counter 2554, which may be functionally similar to 1804, and a visual temperature display 2556, which is functionally similar to 1806.

In various embodiments, the hot water generating system 2502 also includes a generator 2546, which may be functionally similar to the electric generator 308, and lights 2548, which may be functionally similar to the lights 310. The hot water generating system 2502 also includes the hosing 1608 and hosing 108. In various embodiments, the hot water generating system 2502 includes an inlet pipe 2550, which may be utilized in refilling that water tanks 212a,b. The location of any of the components within the hot water generating system 2502 should not be considered limiting on the current disclosure.

In various embodiments, the PLC is in electric communication with the user device 3008 having the HMI 3010. The user device 3008 may allow the operator to see a graphic of the operation of the canopy treatment system 100 via the HMI 3010. For example, in various embodiments, the operator device may allow the operator to see the water level within the water tank 212, the on/off status of the burner 1802, various temperatures within the canopy treatment system 100, the open/closed position of canopy valve 1902, flow levels through the canopy treatment system 100, the start/stop function of the hot water generator 118, a treatment duration timer, a treatment cycle counter, various alarms and warnings for the system, or various other aspects of the canopy treatment system 100.

Generally, FIGS. 30-33 relate to components and modules of a system controller, such as the system controller 3002, which is a computing system. It should be understood that the system controller 3002 may include any appropriate type of computing system and/or computing device, including for example smartphones, tablets, desktops, laptops, workstations, servers, programmable logic controllers (PLC), smart monitors, smart televisions, digital signage, scientific instruments, retail point of sale devices, video walls, imaging devices, peripherals, networking equipment, wearable computing devices, or the like.

Figure 30:
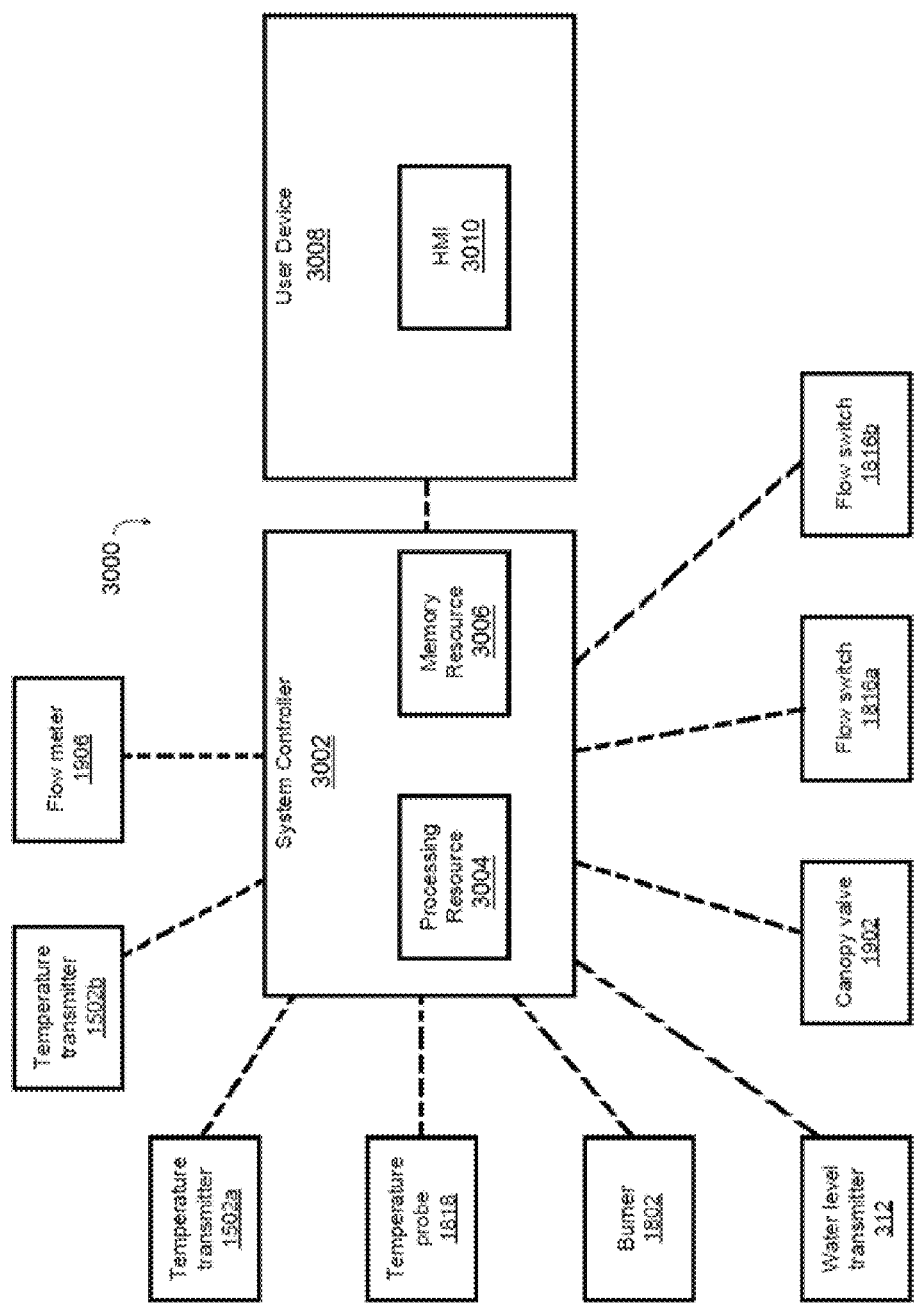
FIG. 30 illustrates a diagram of an environment to implement a treatment technique with the canopy treatment system of FIG. 1.

FIG. 30 illustrates a diagram of an environment 3000 to implement a treatment technique with a canopy treatment system, such as the canopy treatment system 100, according to various embodiments. In various embodiments, the system controller 3002 is in wired or wireless communication with the flow meter 1906, the temperature transmitters 1502a,b, the temperature probe 1818, the burner 1802, the water level transmitter 312, the canopy valve 1902, the flow switches 1816a,b, and the user device 3008 having the HMI 3010.

The flow meter 1906, temperature transmitters 1502a,b, temperature probe 1818, burner 1802, water level transmitter 312, and flow switches 1816a,b may transmit data, respectively, to the system controller 3002 via a wired or wireless network or other communicative path illustrated in FIG. 30 as dotted lines. These paths generally represent a network that may include hardware components and computers interconnected by communications channels that allow sharing of resources and information. The network may include one or more of a cable, wireless, fiber optic, or remote connection via a telecommunication link, an infrared link, a radio frequency link, or any other connectors or systems that provide electronic communication. The network may include, at least in part, an intranet, the internet, or a combination of both. The network may also include intermediate proxies, routers, switches, load balancers, and the like. The paths followed by the network between the devices as depicted in FIG. 30 represent the logical communication paths between and among these the system controller 3002, the flow meter 1906, the temperature transmitters 1502a,b, the temperature probe 1818, the burner 1802, the water level transmitter 312, the canopy valve 1902, the flow switches 1816a,b, and the user device 3008, not necessarily the physical paths between and among the devices. In various embodiments, transceivers may be included to communicate data between the various components. The transceivers may be any suitable device for sending, receiving, or sending and receiving data, such as a receiver, a transmitter, a transmitter-receiver, and/or a transceiver.

The system controller 3002 may include a processing resource 3004 that represents generally any suitable type or form of processing unit or units capable of processing data or interpreting and executing instructions. The processing resource 3004 may be one or more central processing units (CPUs), microprocessors, and/or other hardware devices suitable for retrieval and execution of instructions.

The instructions may be stored, for example, on a memory resource 3006, such as computer-readable storage medium, which may include any electronic, magnetic, optical, or other physical storage device that store executable instructions. Thus, the memory resource may be, for example, random access memory (RAM), electrically-erasable programmable read-only memory (EPPROM), a storage drive, an optical disk, and any other suitable type of volatile or non-volatile memory that stores instructions to cause a programmable processor (i.e., processing resource) to perform the techniques described herein. In examples, the memory resource includes a main memory, such as a RAM in which the instructions may be stored during runtime, and a secondary memory, such as a nonvolatile memory in which a copy of the instructions is stored. The memory resource 3006 is non-transitory in the sense that it does not encompass a transitory signal but instead is made up of one or more memory components configured to store the instructions for the sub-routines 2024, 2200. The memory resource 3006 may be representative of a memory resource and may store machine executable instructions for the sub-routines 2024, 2200, which are executable on a computing system such as the system controller 3002 in conjunction with processing resource 322.

Alternatively or additionally, the system controller 3002 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

The user device 3008 includes the HMI 3010. The HMI 3010 may be or include a monitor, a touchscreen, a projection device, and/or a touch/sensory display device. The HMI 3010 may display text, images, and other appropriate graphical content. The system controller 3002 may also include a network interface to communicatively couple the system controller 3002 to the transceivers, other computing systems, and/or computing devices. The system controller 3002 may also include any suitable input and/or output device, such as a mouse, keyboard, printer, external disk drive, or the like.

Figure 31:
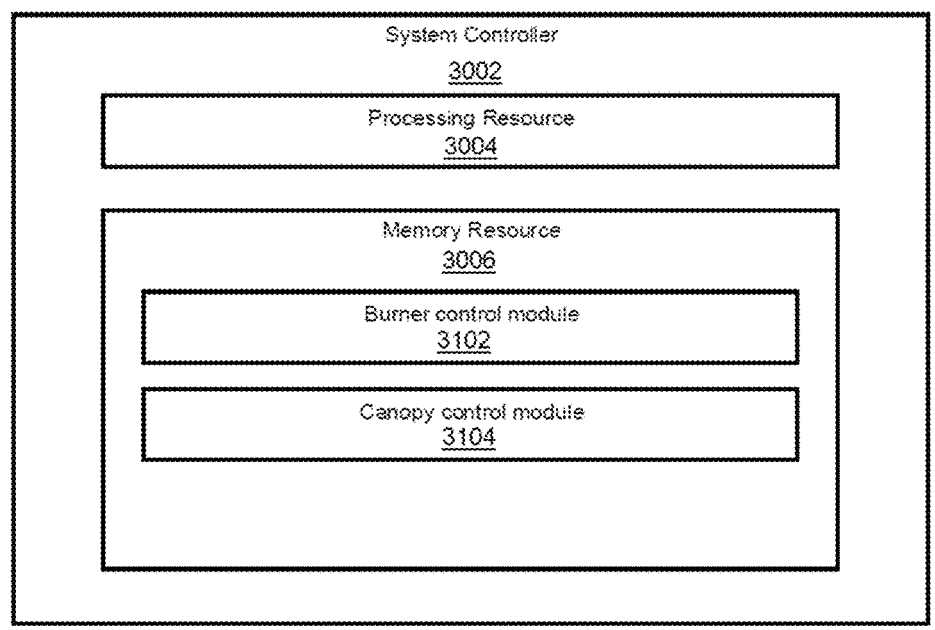
FIG. 31 illustrates a block diagram of a system controller according to aspects of the present disclosure.

FIG. 31 illustrates a block diagram of the system controller 3002 according to various embodiments. The system controller 3002 includes the processing resource 3002 and the memory resource 3006. The system controller 3002 may include a burner control module 3102 and a canopy control module 3104. The burner control module 3102 may be utilized to implement the burner control sub-routine 2200 described above. The canopy control module 3104 may be utilized to implement the tree temperature control sub-routine 2024 described above.

In examples, the modules described herein may be a combination of hardware and programming instructions. The programming instructions may be processor executable instructions stored on a tangible memory resource such as a computer-readable storage medium or other memory resource, and the hardware may include a processing resource for executing those instructions. Thus the memory resource can be said to store program instructions that when executed by the processing resource implement the modules described herein.

Other modules may also be utilized in other examples. In different implementations, more, fewer, and/or other components, modules, instructions, and arrangements thereof may be used according to the teachings described herein. In addition, various components, modules, etc. described herein may be implemented as computer-executable instructions, hardware modules, special-purpose hardware (e.g., application specific hardware, application specific integrated circuits (ASICs), and the like), or some combination or combinations of these.

Figure 32:
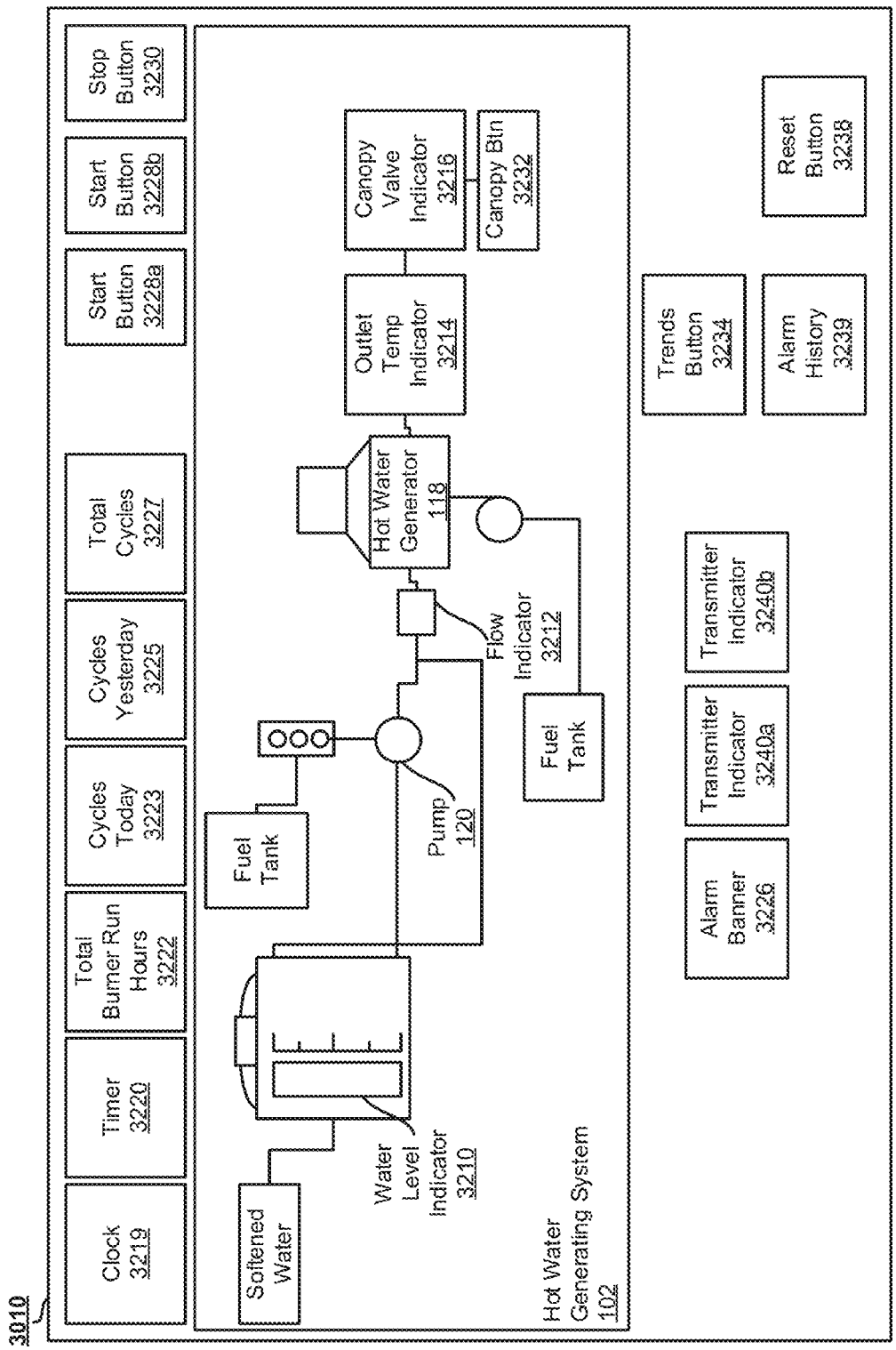
FIG. 32 illustrates a screen shot of an interface of a user device for performing a treatment technique according to aspects of the present disclosure.
Figure 33:
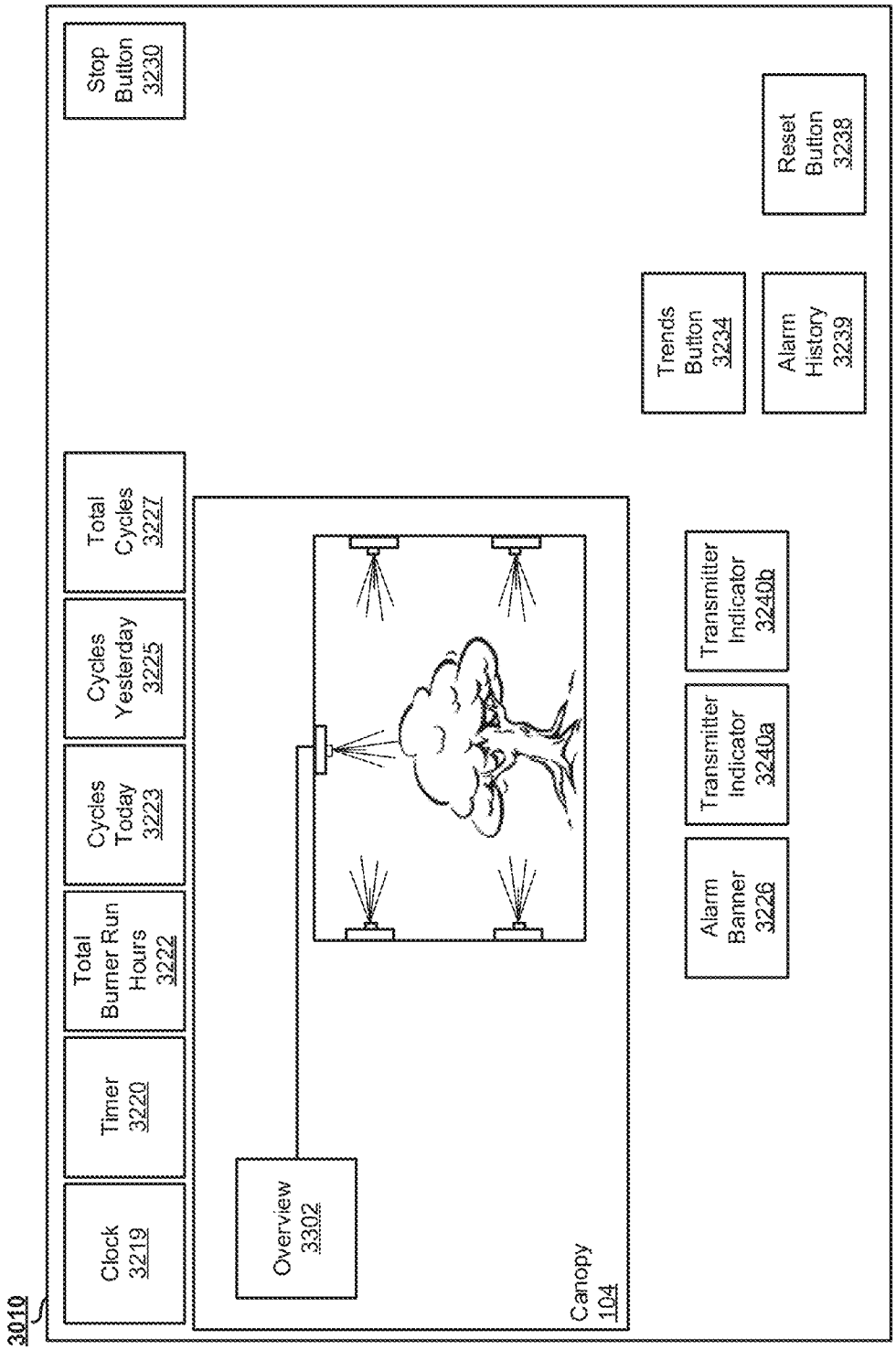
FIG. 33 illustrates a screen shot of an interface of a user device for performing a treatment technique according to aspects of the present disclosure.

FIGS. 32 and 33 illustrate screenshots of the HMI 3010 of the user device 3008 that the operator may utilize to monitor, program, and run the treatment technique as described herein with the canopy treatment system 100. The screen of the HMI 3010 in FIG. 32 illustrates a graphic of the hot water generating system 102 and FIG. 33 illustrates a graphic of the canopy 104.

As illustrated in FIG. 32, the HMI 3010 illustrates a water level indicator 3210 illustrating the water level within the water tank 212 as measured by the water level transmitter 312. A flow indicator 3212 indicates the flow level between the pump 120 and the hot water generator 118, which may be measured by the flow meter 438. An outlet temperature indicator 3214 indicates the temperature of the water exiting the hot water generator 118, which may be measured by the temperature probe 1634. A canopy valve indicator 3216 indicates the position of the canopy valve 1902. A hot water generator indicator 3218 may indicate the on/off status of the hot water generator 118 and the burner 1802.

A clock 3219 display the current date and/or time. A timer 3220 displays the current treatment time and runs from zero to the set treatment duration time, which may be programmed by the operator. The total burner run hours 3222 displays the total burner run time in hours. A cycles today counter 3223 displays a total number of cycles performed today, while a cycles yesterday counter 3225 displays a total number of cycles performed yesterday. A total cycles counter 3227 displays a total number of treatment technique cycles that the canopy treatment system 100 has performed in its lifetime. An alarm banner 3226 may display various alarms and warnings for the canopy treatment system 100 as encountered by the canopy treatment system 100, such as a low water level alarm in the water tank 212 or the temperature alarm from step 2122 of the tree temperature control sub-routine 2024.

Start buttons 3228a,b may be selected by the operator depending on which temperature transmitter 1502a,b, respectively, is positioned proximate to the tree. In the present embodiment, the start button 3228a corresponds with the temperature transmitter 1502a and the start button 3228b corresponds with the temperature transmitter 1502b. The operator may select a stop button 3230 to stop the treatment technique as desired. Transmitter indicators 3240a,b indicate the temperatures measured by the temperature transmitters 1502a,b, respectively.

A canopy button 3232 may be selected by the operator to view the HMI 3010 showing the canopy 104. A trends button 3234 may be selected by the operator to view a history of how the various equipment of the canopy treatment system 100 has been running over a certain time frame. A reset button 3238 may be selected by the operator to reset the active alarms. An alarm history button 3239 may be selected by the operator to navigate to a screen to display a history of previous alarms.

As illustrated in FIG. 33, the HMI 3010 may also illustrate a graphic of the canopy 104 in another screen. The HMI 3010 illustrates the clock 3219, the timer 3220, the total burner run hours 3222, the cycles today 3223 the cycles yesterday 3225, the total cycles 3227, the stop button 3230, the trends button 3234, the reset button 3238, the alarm banner 3226, the alarm history 3239, and the transmitter indicators 3240*a,b*. The graphic also includes an overview button 3302 that may be selected by the operator to view the graphic illustrated in FIG. 32.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. No particular terminology or description should be considered limiting on the disclosure or the scope of any claims issuing therefrom. Directional references such as "up," "down," "top," "left," "right," "front," "back," and "corners," among others are intended to refer to the orientation as illustrated and described in the figure (or figures) to which the components and directions are referencing.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method for treating a plant comprising:
   moving a canopy treatment system proximate to a plant to be treated, the canopy treatment system including a hot fluid generating system and a canopy, the canopy comprising a treatment ring, the canopy and the treatment ring defining a treatment region the treatment ring connected in fluid communication with the hot fluid generating system, the treatment ring comprising:
   a first treatment ring comprising a plurality of first nozzles,
   a second treatment ring comprising a plurality of second nozzles, and
   wherein the method further comprises supplying the heated fluid from the first treatment ring to the second treatment ring, the first treatment ring connected to the second treatment ring in fluid communication by an inter-ring hosing, the second treatment ring suspended below the first treatment ring; and
   the method further comprises spraying the heated fluid through the first nozzle in a first pattern;
   the method further comprises spraying the heated fluid through the second nozzle in a second pattern; and the first pattern is a different pattern from the second pattern;
   lowering the canopy relative to the plant and to the hot fluid generating system to position the canopy and the treatment ring around the plant with the plant within the treatment region of the canopy and the treatment ring; and
   heating the plant within the canopy by spraying a heated fluid through said first or second nozzle and into the treatment region, the heated fluid supplied by the hot fluid generating system.

2. The method of claim 1, wherein:
   the hot fluid generating system includes a hot water generator, a pump, a flow switch, a temperature probe, and a canopy valve; and
   the canopy includes a cover.

3. The method of claim 1, further comprising:
   initiating a treatment technique to maintain a treatment temperature for a treatment duration time within the treatment region; and
   raising the canopy above the plant such that the plant is not within the treatment region after expiration of the treatment duration time.

4. The method of claim 1, further comprising placing a temperature transmitter proximate to the plant, wherein the temperature transmitter is in communication with a system controller, the system controller configured to control fluid communication between the hot fluid generating system and the canopy.

5. The method of claim 4, wherein the plant is a first plant and the temperature transmitter is a first temperature transmitter, the method further comprising placing a second temperature transmitter proximate to a second plant to be treated, the second temperature transmitter in communication with the system controller.

6. The method of claim 1, wherein lowering the canopy includes moving the canopy while the hot fluid generating system remains stationary.

7. The method of claim 6, wherein lowering the canopy includes rotating the canopy about the hot fluid generating system with a hydraulic boom, vertically positioning the canopy relative to the hot fluid generating system with the hydraulic boom, and horizontally positioning the canopy relative to the hot fluid generating system with the hydraulic boom.

8. The method of claim 1, wherein the canopy includes a base ring and a treatment ring, wherein a distance between the base ring and the second treatment ring defines a canopy height, the method further comprising changing the canopy height from a collapsed height to an extended height, wherein the extended height is greater than the collapsed height.

9. The method of claim 8, wherein lowering the canopy relative to the hot fluid generating system to position the canopy around the plant includes moving the canopy while the canopy height is the extended height.

10. The method of claim 1, wherein:
    the hot fluid generating system is mounted on a vehicle; and
    moving the canopy treatment system proximate to the plant to be treated includes driving the vehicle proximate to the plant to be treated.

11. The method of claim 1, wherein the heated fluid is hot water.

12. The method of claim 1, further comprising flowing the heated fluid through the treatment ring from a fluid connector of the treatment ring to said first or second nozzles.

13. A method for treating a plant comprising:
moving a canopy treatment system proximate to a plant to be treated, the canopy treatment system including a hot fluid generating system and a canopy, the canopy comprising a treatment ring, the canopy and the treatment ring defining a treatment region, the treatment ring connected in fluid communication with the hot fluid generating system, the treatment ring comprising:
a first treatment ring comprising a plurality of first nozzles,
a second treatment ring comprising a plurality of second nozzles, and
wherein the method further comprises supplying the heated fluid from the first treatment ring to the second treatment ring, the first treatment ring connected to the second treatment ring in fluid communication by an inter-ring hosing, the second treatment ring suspended below the first treatment ring; and
the method further comprises spraying the heated fluid through the first nozzle in a first pattern;
the method further comprises spraying the heated fluid through the second nozzle in a second pattern; and
the first pattern is a different pattern from the second pattern;
programming a system controller with a treatment duration time and a treatment temperature, the system controller configured to control fluid communication between the hot fluid generating system and the treatment ring; and
spraying a heated fluid into the treatment region through said first or second nozzle mounted on the treatment ring, the heated fluid supplied by the hot fluid generating system.

14. The method of claim 13, further comprising:
moving the canopy relative to the hot fluid generating system to position the canopy over a top of the plant;
lowering the canopy around the plant with an elevating mechanism to position the plant within the treatment region; and
initiating a treatment technique to treat the plant by maintaining the treatment temperature for the treatment duration time within the treatment region.

15. The method of claim 14, further comprising raising the canopy above the plant after expiration of the treatment duration time.

16. The method of claim 13, wherein the plant is a first plant, the method further comprising:
positioning a first temperature transmitter proximate to the first plant;
lowering the canopy around the first plant to position the first plant within the treatment region; and
positioning a second temperature transmitter proximate to a second plant.

17. The method of claim 16, further comprising:
raising the canopy above the first plant after expiration of the treatment duration time;
moving the canopy treatment system proximate to the second plant;
lowering the canopy around the second plant to position the second plant within the treatment region; and
moving the first temperature transmitter from proximate to the first plant to proximate to a third plant.

18. The method of claim 13, further comprising controlling the treatment temperature by controlling a fluid flow of the heated fluid through said first or second nozzles.

* * * * *